US 9,900,886 B2

(12) United States Patent
Wild et al.

(10) Patent No.: US 9,900,886 B2
(45) Date of Patent: Feb. 20, 2018

(54) TRANSMITTER APPARATUS FOR CONDITIONING A MULTICARRIER SIGNAL, NETWORK NODE, METHOD FOR CONDITIONING A MULTICARRIER SIGNAL, AND COMPUTER PROGRAM THEREOF

(71) Applicant: Alcatel Lucent, Boulogne Billancourt (FR)

(72) Inventors: Thorsten Wild, Stuttgart (DE); Frank Schaich, Stuttgart (DE); Yejian Chen, Stuttgart (DE); Stephan Ten Brink, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 42 days.

(21) Appl. No.: 14/910,063

(22) PCT Filed: Jul. 17, 2014

(86) PCT No.: PCT/EP2014/065368
§ 371 (c)(1),
(2) Date: Feb. 4, 2016

(87) PCT Pub. No.: WO2015/018621
PCT Pub. Date: Feb. 12, 2015

(65) Prior Publication Data
US 2016/0198446 A1 Jul. 7, 2016

(30) Foreign Application Priority Data
Aug. 5, 2013 (EP) .................................... 13306122

(51) Int. Cl.
| H04W 72/04 | (2009.01) |
| H04L 5/00 | (2006.01) |
| H04L 27/26 | (2006.01) |

(52) U.S. Cl.
CPC ......... *H04W 72/044* (2013.01); *H04L 5/0037* (2013.01); *H04L 5/0066* (2013.01); *H04L 27/264* (2013.01)

(58) Field of Classification Search
None
See application file for complete search history.

(56) References Cited

U.S. PATENT DOCUMENTS 6,411,653 B1 * 6/2002 Arunachalam ...... H04B 1/0021
348/395.1
6,496,546 B1 * 12/2002 Allpress ............... H04B 1/0003
375/316

(Continued)

FOREIGN PATENT DOCUMENTS

| EP | 2 128 992 A1 | 12/2009 |
| EP | 2 573 990 A1 | 3/2013 |

(Continued)

OTHER PUBLICATIONS

Li Ping et al., "A Simple Approach to Near-Optimal Multiuser Detection: Interleave-Division Multiple-Access," IEEE, pp. 391-396, 2003.

(Continued)

*Primary Examiner* — Charles C Jiang
*Assistant Examiner* — Rose Clark
(74) *Attorney, Agent, or Firm* — Fay Sharpe, LLP

(57) ABSTRACT

The embodiments of the invention relate to a transmitter apparatus (TA1) for conditioning a multicarrier signal (RFS). The transmitter apparatus (TA1) contains means (FE-PU) for grouping subcarriers of the multicarrier signal (RFS) into a first frequency block, which contains a first group of the subcarriers and into at least a second frequency block, which contains at least a second group of said subcarriers. The transmitter apparatus (TA1) further con- (Continued)

tains first filtering means (LPF-1) for sideband suppression outside of the first frequency block and at least second filtering means (LPF-2, LPF-M) for simultaneous and separate sideband suppression outside of the at least second frequency block. The embodiments of the invention further relate to a method for conditioning a multicarrier signal (RFS). The method contains grouping subcarriers of the multicarrier signal (RFS) into a first frequency block, which contains a first group of said subcarriers and into at least a second frequency block, which contains at least a second group of said subcarriers. The method further contains filtering the first frequency block for sideband suppression outside the first frequency block, and filtering the at least second frequency block for simultaneous and separate sideband suppression outside the at least second frequency block. The embodiments of the invention even further relate to a computer program having a program code for performing the method, when the computer program is executed on a computer or processor and to a network node, which contains the transmitter apparatus.

15 Claims, 11 Drawing Sheets

(56) References Cited

U.S. PATENT DOCUMENTS

| | | | | |
|---|---|---|---|---|
| 9,490,750 | B2* | 11/2016 | Wollesen | H04B 1/001 |
| 2004/0141548 | A1* | 7/2004 | Shattil | H04L 1/04 |
| | | | | 375/146 |
| 2008/0316912 | A1* | 12/2008 | Al Adnani | G06F 17/148 |
| | | | | 370/210 |
| 2009/0175159 | A1* | 7/2009 | Bertrand | H04W 72/0406 |
| | | | | 370/203 |
| 2009/0323510 | A1* | 12/2009 | Furrer | H04L 27/265 |
| | | | | 370/210 |
| 2010/0246558 | A1 | 9/2010 | Harel | |
| 2015/0304146 | A1* | 10/2015 | Yang | H04L 5/0066 |
| | | | | 370/329 |

FOREIGN PATENT DOCUMENTS

| | | |
|---|---|---|
| EP | 2 608 474 A1 | 6/2013 |
| JP | 2002-290368 | 10/2002 |
| JP | 2004-531913 | 10/2004 |
| JP | 2008-125070 | 5/2008 |
| JP | 2010-124334 | 6/2010 |
| JP | 2010-232857 | 10/2010 |
| JP | 2012-503905 | 2/2012 |
| KR | 10-2008-0042585 | 5/2008 |

OTHER PUBLICATIONS

Behrouz Farhang-Boroujeny, "OFDM Versus Filter Bank Multicarrier [Development of broadband communication systems]," IEEE Signal Processing Magazine, 92, pp. 22 pages, May 2011.
Universal-Filtered Multi-Carrier Technique for Wireless Systems Beyond LTE, Globecom 2013 Workshop—Broadband Wireless Access, IEEE, pp. 223-228, 2013.
International Search Report for PCT/EP2014/065368 dated Oct. 9, 2014.

* cited by examiner

TRANSMITTER APPARATUS FOR CONDITIONING A MULTICARRIER SIGNAL, NETWORK NODE, METHOD FOR CONDITIONING A MULTICARRIER SIGNAL, AND COMPUTER PROGRAM THEREOF

FIELD OF THE INVENTION

The present invention relates to conditioning of multicarrier signals in a communication system and, more particularly but not exclusively, to conditioning of multicarrier signals for a fragmented spectrum in a radio communication system.

BACKGROUND

This section introduces aspects that may be helpful in facilitating a better understanding of the invention. Accordingly, the statements of this section are to be read in this light and are not to be understood as admission about what is in the prior art.

In 3GPP LTE (3GPP=3rd Generation Partnership Project, LTE=Long Term Evolution) for example it is suggested to use so-called fragmented bands by carrier aggregation for increasing the data rates in a wireless communication system. Thereby, the wireless communication system may be allowed to use a frequency band or a part of a frequency band of another wireless communication system, when one base station or several base stations of the other wireless communication system is/are not operated at full capacity. In such a case, an emission of a radio frequency signal by the wireless communication system in a frequency band still used by the other wireless communication must be prevented without fail.

For upcoming machine-to-machine communication with low cost radio transmitters, synchronization requirements with respect to timing and frequency stability will likely be less stringent than for radio transmitters which are currently applied in cellular radio communication systems. Also so-called CoMP transmissions (CoMP=coordinated multipoint) exhibit timing offsets and frequency offset, when radio frequency signals propagate for example from two or more base stations via different propagation paths to a mobile station. The timing offsets may cause inter-carrier interference. By using conventional OFDM subcarriers transmission quality degrades fast, when the timing offset exceeds the so-called cyclic prefix.

Classical multicarrier signals such as OFDM multicarrier signal (OFDM=Orthogonal Frequency Division Multiplexing) are based on time domain signals having a rectangular shape. The rectangular shape in the time domain is associated with a shape of a so-called sinc-function in the frequency domain. Thereby, subcarriers of a multicarrier signal have rather high side-lobe levels. When using an OFDM multicarrier signal for the above mentioned application in fragmented spectrum, guard bands separating the fragmented sub-bands of the fragmented spectrum must be sufficiently large.

SUMMARY

Classical multicarrier signals don't provide all requirements for upcoming radio frequency applications. Thus, an object of the embodiments of the invention is to generate advanced multicarrier signals for ongoing and upcoming radio frequency applications.

The object is achieved by a transmitter apparatus for conditioning a multicarrier signal. The transmitter apparatus contains means for grouping subcarriers of the multicarrier signal into a first frequency block, which contains a first group of said subcarriers and into at least a second frequency block, which contains at least a second group of said subcarriers. The transmitter apparatus further contains first filtering means for sideband suppression outside of the first frequency block and at least second filtering means for simultaneous and separate sideband suppression outside of the at least second frequency block.

In embodiments, the means for grouping the subcarriers of the multicarrier signal may correspond to any grouping unit, splitting unit, partitioning unit, fragmentation unit, segmentation unit etc. Hence, in embodiments the means for grouping the subcarriers of the multicarrier signal may contain an input for the multicarrier signal, an algorithm, which groups the subcarriers for the first frequency block and for the at least second frequency block, and an output for the first frequency block and the at least second frequency block. In some embodiments the means for grouping the subcarriers of the multicarrier signal can be implemented in terms of a computer program and a hardware component on which the computer program is executed, such as a DSP (DSP=Digital Signal Processor), an ASIC (ASIC=Application-Specific Integrated Circuit), an FPGA (FPGA=Field-Programmable Gate Array) or any other processor.

In embodiments, the first filtering means may correspond to any filtering unit, filter unit, radio frequency filter etc. Hence, in embodiments the first filtering means may contain an input for a signal, which contains the first frequency block, an algorithm, which filters the signal with a filter characteristic, which is adapted to a frequency position of the first frequency block, and an output for the filtered signal. In some embodiments the first filtering means can be implemented in terms of a computer program and a hardware component on which the computer program is executed, such as a DSP, an ASIC, an FPGA or any other processor.

In embodiments, the at least second filtering means may correspond to any further filtering unit, filter unit, radio frequency filter etc. Hence, in embodiments the at least second filtering means may contain an input for a further signal, which contains the at least second frequency block, an algorithm, which filters the further signal with a further filter characteristic, which is adapted to a frequency position of the at least second frequency block, and an output for the filtered further signal. In some embodiments the at least second filtering means can be implemented in terms of a computer program and a hardware component on which the computer program is executed, such as a DSP, an ASIC, an FPGA or any other processor.

The object is further achieved by a method for conditioning a multicarrier signal. The method contains the step of grouping subcarriers of the multicarrier signal into a first frequency block, which contains a first group of the subcarriers and into at least a second frequency block, which contains at least a second group of the subcarriers. The method further contains the steps of filtering the first frequency block for sideband suppression outside of the first frequency block, and filtering the at least second frequency block for simultaneous and separate sideband suppression outside of the at least second frequency block.

The object is even further achieved by a computer program having a program code for performing the method, when the computer program is executed on a computer or processor.

The transmitter apparatus, the method and the computer program allows for an advanced signal structure showing a reduction of the side-lobe levels in comparison to classical OFDM multicarrier signals. When a user with a time shifted OFDM signal operates in a sub-band, which is a neighboring sub-band to a sub-band of a user of interest, a preceding or subsequent OFDM symbol overlaps with an OFDM symbol of interest of the user of interest and may generate ICI (ICI=Inter Channel Interference), which may propagate along a whole frequency band. In a time domain, radio frequency signals according to the advanced signal structure start smoothly and therefore don't generate—in case of a time offset—a same amount of ICI, which is suppressed in addition by the filtering means.

Simulation results show that for achieving a certain symbol error rate in the presence of asynchronous adjacent channel interference, which occur from 5G requirements of relaxing synchronicity, several decibels of performance improvement compared to OFDM can be achieved, when measuring an MSE parameter (MSE=mean squared error) for a given timing offset between transmitted symbols and received symbols equalized with a linear receiver (e.g. zero forcing). This allows for relaxed requirements on oscillators and allows for an application in fragmented bands and for an application in asynchronous systems such as contention-based multiple access systems with only coarse (open-loop) synchronization, based on downlink synchronization signals, suited to sporadic traffic from many machine-type devices. The simultaneous and separate filtering of the frequency blocks allows for a shortening of the filter lengths (compared to per-subcarrier filtering) and therefore, making the transmitter apparatus more suitable for a transmission of short transmission bursts, which are for example required in MTC (MTC=machine-type communication). The envisage filter lengths are in the order of the OFDM-cyclic prefix such as defined for example for the LTE system in 3GPP TS36.211. A filtering of an entire frequency block of sub-carriers allows wider pass-band ranges in comparison to a per-subcarrier filtering.

In a preferred embodiment, the transmitter apparatus further contains means for performing a Fourier transformation of the first frequency block and of the at least second frequency block for generating a first part and at least a second part of a time domain signal. In such a case, the first filtering means may be adapted for filtering the first part and the at least second filtering means may be adapted for filtering the at least second part.

In embodiments, the means for performing the Fourier transformation may correspond to any performing unit, execution unit, processing unit, etc. Hence, in embodiments, the means for performing the Fourier transformation may contain an input for the first frequency block and the at least second frequency block, an algorithm, which performs the Fourier transformation and an output for the first part and the at least second part of the time domain signal. In some embodiments the performing the Fourier transformation can be implemented in terms of a computer program and a hardware component on which the computer program is executed, such as a DSP, an ASIC, an FPGA or any other processor.

According to a first embodiment, the means for performing the Fourier transformation are adapted to perform a single inverse fast Fourier transformation and the first filtering means and the at least second filtering means may be low pass filters preferably in a digital domain. In doing so, the first filtering means may contain means for shifting the first frequency block to a frequency position around a zero frequency. Likewise the at least second filtering means may contain means for shifting the at least second frequency block to the frequency position around the zero frequency. The transmitter apparatus of the first embodiment may further contain means for up-sampling the filtered first frequency block, means for shifting the up-sampled and filtered first frequency block to a first frequency range of the multicarrier signal, means for up-sampling the filtered at least second frequency block, and means for shifting the up-sampled and filtered at least second frequency block to at least one second frequency range of the multicarrier signal.

In embodiments, the means for up-sampling the filtered first frequency block may correspond to any up-sampling unit, up-sampler, etc. Hence, in embodiments the means for up-sampling the filtered first frequency block may contain an input for the filtered first frequency block, an algorithm, which executes the up-sampling, and an output for the up-sampled and filtered first frequency block. The up-sampling may include a usage of an interpolation filter and an insertion of additional zero-valued samples. In case of a rational fraction to change in sampling rate, an additional downsampling may be included. In some embodiments the means for up-sampling the filtered first frequency block can be implemented in terms of a computer program and a hardware component on which the computer program is executed, such as a DSP, an ASIC, an FPGA or any other processor.

In embodiments, the means for shifting the up-sampled and filtered first frequency block may correspond to any frequency shifting unit, frequency mixing unit, frequency mixer etc. Hence, in embodiments the means for shifting the up-sampled and filtered first frequency block may contain an input for the up-sampled and filtered first frequency block, an algorithm or a mechanism, which performs the frequency shift to the first frequency range, and an output for the frequency shifted, up-sampled and filtered first frequency block. In some embodiments the means for shifting the up-sampled and filtered first frequency block can be implemented in terms of a computer program and a hardware component on which the computer program is executed, such as a DSP, an ASIC, an FPGA or any other processor.

In embodiments, the means for up-sampling the filtered at least second frequency block may correspond to any further up-sampling unit, up-sampler etc. Hence, in embodiments the means for up-sampling the filtered at least second frequency block may contain an input for the filtered at least second frequency block, an algorithm, which executes the up-sampling, and an output for the up-sampled and filtered at least second frequency block. In some embodiments the means for up-sampling the filtered at least second frequency block can be implemented in terms of a computer program and a hardware component on which the computer program is executed, such as a DSP, an ASIC, an FPGA or any other processor.

In embodiments, the means for shifting the up-sampled and filtered at least second frequency block may correspond to any further frequency shifting unit, frequency mixing unit, frequency mixer etc. Hence, in embodiments the means for shifting the up-sampled and filtered at least second frequency block may contain an input for the up-sampled and filtered at least second frequency block, an algorithm or a mechanism, which performs the frequency shift to the at least second frequency range, and an output for the frequency shifted, up-sampled and filtered at least second frequency block. In some embodiments the means for shifting the up-sampled and filtered at least second frequency block can be implemented in terms of a computer program and a hardware component on which the computer program is executed, such as a DSP, an ASIC, an FPGA or any other processor.

The first embodiment provides the advantage of requiring only a single inverse fast Fourier transformation. It provides a further advantage of allowing a signal processing at reduced sampling rates up to inputs of the respective means for up-sampling. According to an even further advantage the frequency blocks can be filtered by low pass filters of a same type. Furthermore, the first embodiment provides a reasonable flexibility with respect to frequency positioning of the respective frequency blocks.

According to a second embodiment, first means of the means for performing the Fourier transformation are adapted to perform a first inverse discrete Fourier transformation and a first up-conversion for generating a first up-converted part of the time domain signal for the first frequency block and at least second means of the means for performing the Fourier transformation are adapted to perform at least a second inverse discrete Fourier transformation for the at least second frequency block.

The second embodiment requires fewer building blocks than the first embodiment because interpolation and up-conversion can be done in a single processing unit, which executes an IDFT spreading operation. Thus the IDFT including up-sampling can be viewed as a spreading operation in the sense of CDMA (CDMA=code division multiple access). Furthermore, a reconfiguration of one of the frequency blocks does not disturb the other frequency blocks. In addition, the building blocks allow for a highly parallelized processing structure. The first embodiment provides a reasonable flexibility with respect to frequency positioning of the respective frequency blocks as well. The highly parallelized structure allows for e.g. shifting blocks in a fine-granular way into frequency positions which are no integer multiples of the subcarrier spacing. Additionally the increased flexibility includes using different numbers of subcarriers per frequency block or not using certain subcarrier positions in a computationally efficient way. Furthermore, non-uniform subcarrier spacings are possible.

In a first alternative of the second embodiment, the first means of the means for performing the Fourier transformation may be further adapted to perform a first frequency shift to a first frequency range for the first frequency block, the at least second means for performing the Fourier transformation may be further adapted to perform at least a second frequency shift to at least a second frequency range for the at least second frequency block, the first filtering means may be a first band pass filter for the first frequency block and the at least second filtering means may be at least a second band pass filter for the at least second frequency block.

In a second alternative of second embodiment, the first filtering means may be a first low pass filter and the at least second filtering means may be at least a second low pass filter. In addition, the transmitter apparatus may further contain means for shifting the filtered first frequency block to the first frequency range and means for shifting the filtered at least second frequency block to the at least second frequency range.

In embodiments, the means for shifting the filtered first frequency block may correspond to any frequency shifting unit, frequency mixing unit, frequency mixer etc. Hence, in embodiments the means for shifting the filtered first frequency block may contain an input for the filtered first frequency block, an algorithm or a mechanism, which performs the frequency shift to the first frequency range, and an output for the frequency shifted and filtered first frequency block. In some embodiments the means for shifting the filtered first frequency block can be implemented in terms of a computer program and a hardware component on which the computer program is executed, such as a DSP, an ASIC, an FPGA or any other processor.

In embodiments, the means for shifting the filtered at least second frequency block may correspond to any further frequency shifting unit, frequency mixing unit, frequency mixer etc. Hence, in embodiments the means for shifting the filtered at least second frequency block may contain an input for the filtered at least second frequency block, an algorithm or a mechanism, which performs the frequency shift to the at least second frequency range, and an output for the frequency shifted and filtered at least second frequency block. In some embodiments the means for shifting the filtered at least second frequency block can be implemented in terms of a computer program and a hardware component on which the computer program is executed, such as a DSP, an ASIC, an FPGA or any other processor.

According to a third embodiment, first means of the means for performing the Fourier transformation are adapted to perform a first inverse fast Fourier transformation for the first frequency block, at least second means of the means for performing the Fourier transformation are adapted to perform at least a second inverse fast Fourier transformation for the at least second frequency block and the first filtering means and the at least second filtering means may be low pass filters. For the third embodiment the transmitter apparatus may further contain means for up-sampling the filtered first frequency block of the first part of the time domain signal, means for shifting the up-sampled and filtered first frequency block to a first frequency range of the multicarrier signal, means for up-sampling the filtered at least second frequency block of the at least second part of the time domain signal, and means for shifting the up-sampled and filtered at least second frequency block to at least a second frequency range of the multicarrier signal.

In embodiments, the means for up-sampling the filtered first frequency block of the first part of the time domain signal may correspond to any up-sampling unit, up-sampler, etc. Hence, in embodiments the means for up-sampling the filtered first frequency block may contain an input for the filtered first frequency block, an algorithm, which executes the up-sampling, and an output for the up-sampled and filtered first frequency block. In some embodiments the means for up-sampling the filtered first frequency block can be implemented in terms of a computer program and a hardware component on which the computer program is executed, such as a DSP, an ASIC, an FPGA or any other processor.

In embodiments, the means for shifting the up-sampled and filtered first frequency block may correspond to any frequency shifting unit, frequency mixing unit, frequency mixer etc. Hence, in embodiments the means for shifting the up-sampled and filtered first frequency block may contain an input for the up-sampled and filtered first frequency block, an algorithm or a mechanism, which performs the frequency shift to the first frequency range, and an output for the frequency shifted, up-sampled and filtered first frequency block. In some embodiments the means for shifting the up-sampled and filtered first frequency block can be implemented in terms of a computer program and a hardware component on which the computer program is executed, such as a DSP, an ASIC, an FPGA or any other processor.

In embodiments, the means for up-sampling the filtered at least second frequency block of the at least second part of the time domain signal may correspond to any further up-sampling unit, up-sampler etc. Hence, in embodiments the means for up-sampling the filtered at least second frequency block may contain an input for the filtered at least second frequency block, an algorithm, which executes the up-sampling, and an output for the up-sampled and filtered at least second frequency block. In some embodiments the means for up-sampling the filtered at least second frequency block can be implemented in terms of a computer program and a hardware component on which the computer program is executed, such as a DSP, an ASIC, an FPGA or any other processor.

In embodiments, the means for shifting the up-sampled and filtered at least second frequency block may correspond to any further frequency shifting unit, frequency mixing unit, frequency mixer etc. Hence, in embodiments the means for shifting the up-sampled and filtered at least second frequency block may contain an input for the up-sampled and filtered at least second frequency block, an algorithm or a mechanism, which performs the frequency shift to the at least second frequency range, and an output for the frequency shifted, up-sampled and filtered at least second frequency block. In some embodiments the means for shifting the up-sampled and filtered at least second frequency block can be implemented in terms of a computer program and a hardware component on which the computer program is executed, such as a DSP, an ASIC, an FPGA or any other processor.

The third embodiment provides the following advantages: Separate signal processing chains for each frequency block can be operated on low sampling rates up to the inputs of the up-sampling units. Filters for the side lobe suppression can be easily realized by low pass filters. The separate signal processing chains allow for a high flexibility for conditioning a respective frequency block with parameters such as multi-carrier spacing, frequency position, transmission power etc. A reconfiguration of one of the frequency blocks does not disturb a signal processing and transmission of the other frequency blocks. A complexity of the inverse fast Fourier transformations of the respective signal processing chains is considerably lower than for the first embodiment. The highly parallelized structure allows for e.g. shifting blocks in a fine-granular way into frequency positions which are no integer multiples of the subcarrier spacing. Additionally the increased flexibility includes using different numbers of subcarriers per frequency block or not using certain subcarrier positions in a computationally efficient way. Furthermore, non-uniform subcarrier spacings are possible.

According to further embodiments, the first filtering means and the at least second filtering means may be adapted either to filter at least two sub-bands of a fragmented spectrum, which are separated by at least one guard band or to filter at least two sub-units of at least one sub-band. The at least two sub-units may be for example at least two physical resource blocks such as LTE PRBs (PRB=Physical Resource Block).

Preferably, the transmitter apparatus may further contain means for switching between a filtering of the at least two sub-bands and a filtering of the at least two subunits of the at least one sub-band. The filtering of the at least two sub-units can also be done, when the transmitter apparatus transmit radio frequency signals only in a single sub-band and does not transmit radio frequency signals via two or more sub-bands of a fragmented spectrum.

With respect to even further embodiments, the transmitter apparatus may further contain either a single radio frequency processing unit for processing the filtered first frequency block and the filtered at least second frequency block and for generating the multicarrier signal or may further contain a first radio frequency processing sub-unit for processing at least one of the filtered first frequency block and the filtered at least second frequency block and at least one second radio frequency processing sub-unit for processing at least one further of the filtered first frequency block and the filtered at least second frequency block. Each one of the radio frequency processing units or sub-units may contain for example at least one of the following: a D/A converter, a mixer, a power amplifier, a cavity radio frequency filter etc.

In a further preferred embodiment, the transmitter apparatus may further contain means for reconfiguring the transmitter apparatus between at least two of the following transmitter types:
a first transmitter type according to the first embodiment, which is mentioned above,
a second transmitter type according to one of the alternatives described above for the second embodiment,
a third transmitter type according to the third embodiment, which is mentioned above.

Preferably the means for reconfiguring are adapted to reconfigure the transmitter apparatus to the first transmitter type, when a size of an input vector of an FFT (FFT=Fast Fourier Transform) falls below a predefined size, and/or the means for reconfiguring are adapted to reconfigure the transmitter apparatus to the second transmitter type, when the size of the input vector of the FFT is equal to or above the predefined size and when an overall number of sub-bands is below a predefined number, and/or the means for reconfiguring are adapted to reconfigure the transmitter apparatus to the third transmitter type, when the size of the input vector of the FFT of this transmitter type is equal to or above the predefined size and when the overall number of sub-bands is equal to or above the predefined number, and/or wherein the means for reconfiguring are adapted to reconfigure the transmitter apparatus to the third transmitter type, when a usability of the first frequency block and/or the at least a second frequency block for a predefined radio access technology or for a predefined radio communication system changes periodically.

Further advantageous features of the embodiments of the invention are defined and are described in the following detailed description.

BRIEF DESCRIPTION OF THE FIGURES

The embodiments of the invention will become apparent in the following detailed description and will be illustrated by accompanying figures given by way of non-limiting illustrations.

DESCRIPTION OF THE EMBODIMENTS

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 1:
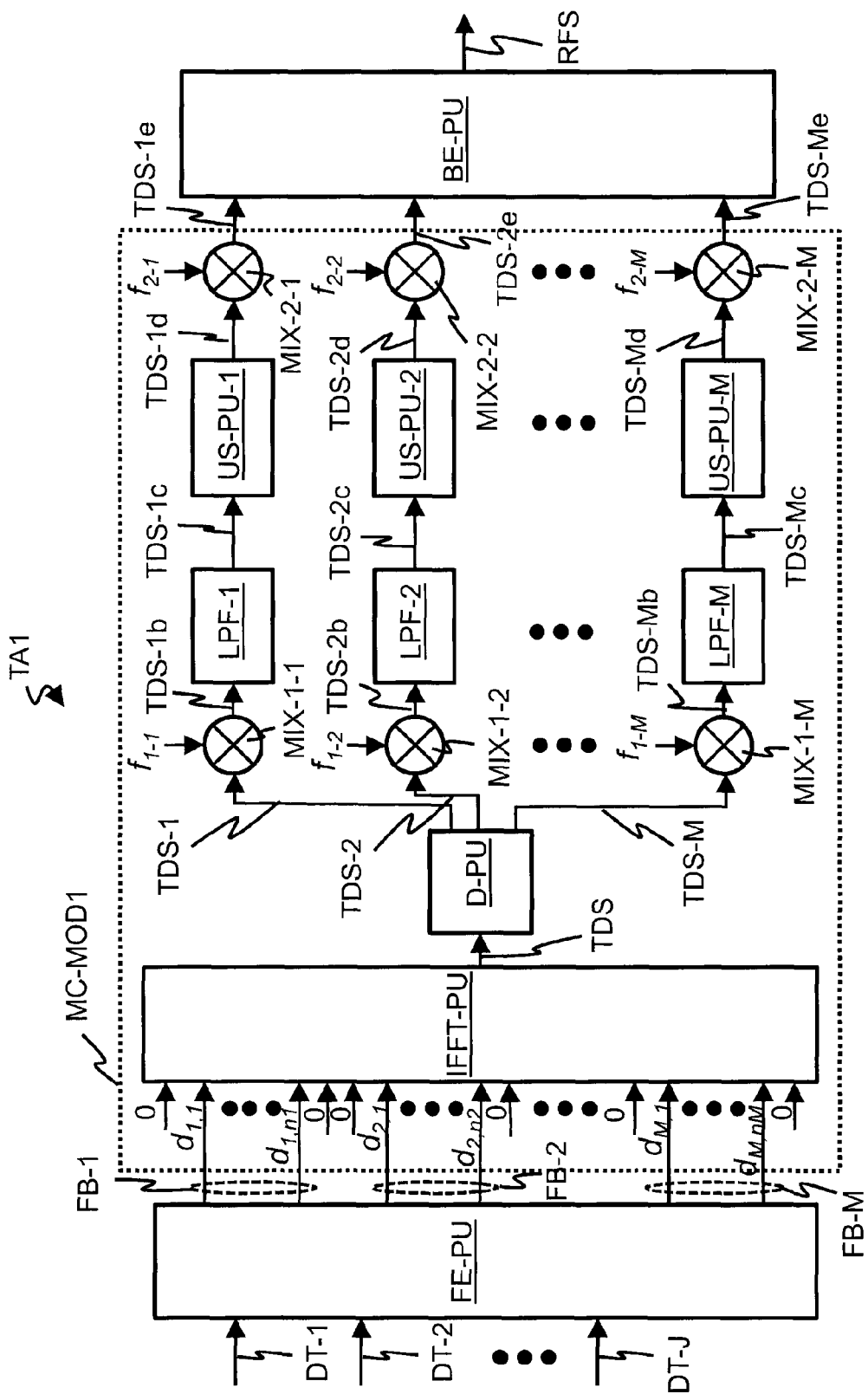
FIG. 1 shows schematically a block diagram of a transmitter apparatus for conditioning a multicarrier signal according to a first embodiment.

FIG. 1 shows schematically a block diagram of a transmitter apparatus TA1 for conditioning a multicarrier signal according to a first embodiment. A splitting of processing functions across processing units shown in FIG. 1 is not critical, and as can be understood by those skilled in the art that the number of processing units, the number of processing functions and an allocation of the processing functions to the processing units may vary without departing from the scope of the embodiments of the invention as defined in the appended claims.

The transmitter apparatus TA1 contains an input for one data symbol layer or several data symbol layers DT-1, DT-2, . . . , DT-J, a so-called front end processing unit FE-PU for a pre-processing of the data symbol layers DT-1, DT-2, . . . , DT-J, a modulator MC-MOD1 (indicated in FIG. 1 by a dotted line) for modulation and further processing of frequency blocks FB-1, FB-2, . . . , FB-M, a so-called back end processing unit BE-PU for a post-processing of time domain signals TDS-1e, TDS-2e, . . . , TDS-Me and an output for radio frequency signals RFS, which contain the data symbol layers DT-1, DT-2, . . . , DT-J. Following description is only given for the case of applying several data symbol layers DT-1, DT-2, . . . , DT-J. A skilled person may easily adapt the transmitter apparatus TA1 for handling a single data symbol layer.

The different data symbols layers DT-1, DT-2, . . . , DT-J may correspond for example to encoded bit sequences, which are mapped to a constellation alphabet, like QPSK, 16-QAM etc. The data symbol layers DT-1, DT-2, . . . , DT-J may provide, besides the dimensions time and frequency, a further multiple access dimension, which in a CDMA sense can be interpreted as code, due to spreading, or in an IDMA sense (IDMA=interleave division multiple access) as channel coded layer. Alternatively, the data symbol layers DT-1, DT-2, . . . , DT-J may already be block-wise grouped in frequency (into L groups) to be arranged for a fragmented spectrum, leaving gaps for avoiding interference to other radio communication systems operating in a same frequency range.

Figure 2:
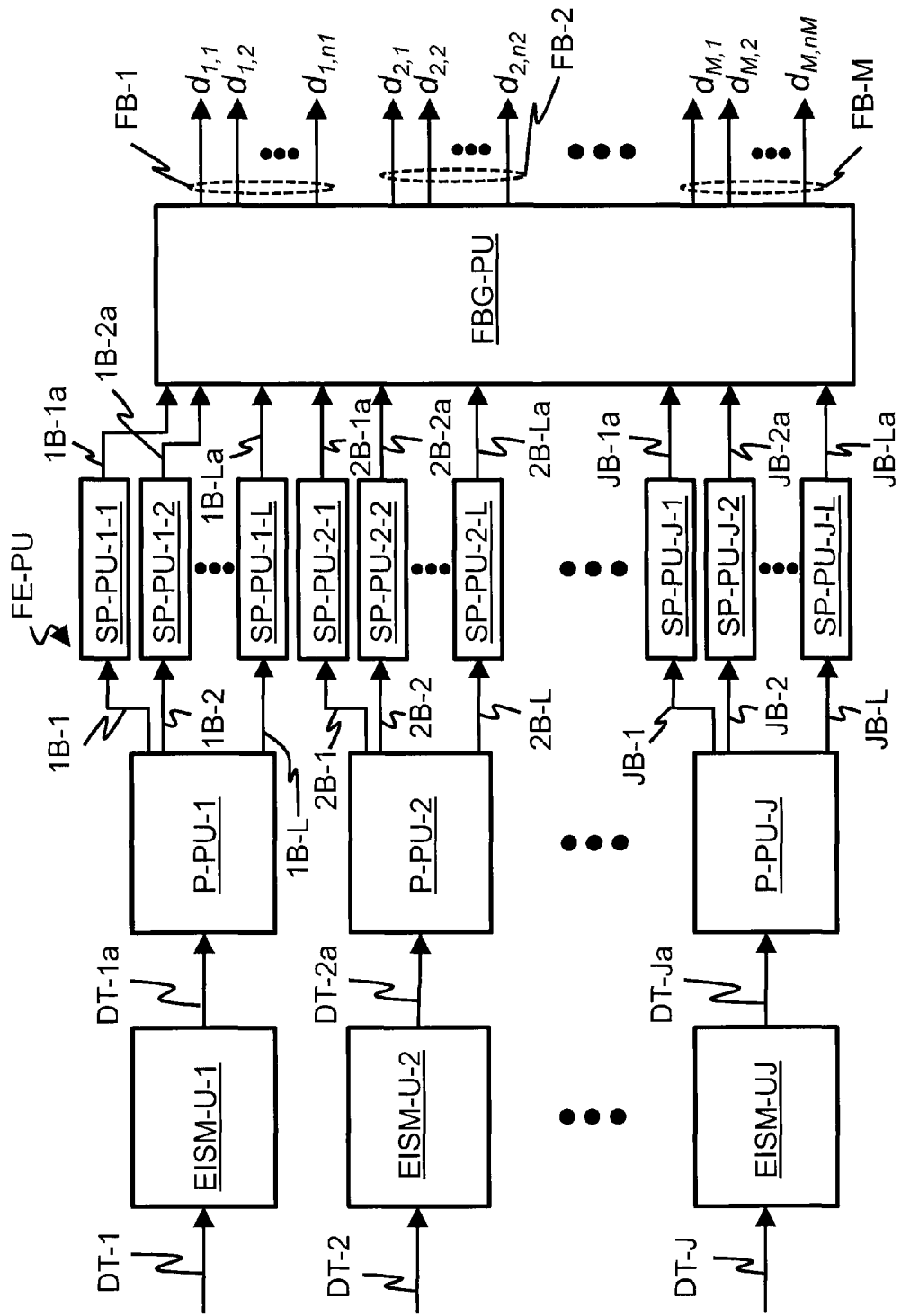
FIG. 2 shows schematically a block diagram of a front end processing unit of the transmitter apparatus according to the first embodiment.

The front end processing unit FE-PU is shown in more detail by FIG. 2. A splitting of processing functions across processing units shown in FIG. 2 is not critical, and as can be understood by those skilled in the art that the number of processing units, the number of processing functions and an allocation of the processing functions to the processing units may vary without departing from the scope of the embodiments of the invention as defined in the appended claims.

A first data symbol layer DT-1 may be provided to a first processing unit EISM-PU-1 for an encoding, interleaving, scrambling and symbol mapping according to one of the techniques known to persons skilled in the art for generating a first encoded, interleaved, scrambled and symbol mapped data symbol layer DT-1a.

In a same way, a further number J−1 of data symbol layers DT-2, . . . , DT-J may be processed by further first processing units EISM-PU-2, . . . , EISM-PU-J for generating corresponding further encoded, interleaved, scrambled and symbol mapped data symbol layers DT-2a, . . . , DT-Ja. The data symbol layers DT-2a, . . . , DT-Ja may be represented for example by data symbol vectors $b_j$ with $j \in [1,2, \ldots, J]$.

The first processing units EISM-PU-1, EISM-PU-2, . . . , EISM-PU-J may be applied for an efficient multi-user detection and/or multi-user separation. This means, that the interleaving and/or scrambling may be user-specific or layer-specific. By way of example a signal intended for one user could carry multiple signal layers, e.g. each having a different QoS requirement (QoS=quality of service).

The first encoded, interleaved, scrambled and symbol mapped data symbol layer DT-1a may be provided to a second processing unit P-PU-1 for a partitioning into L data blocks 1B-1, 1B-2, . . . , 1B-L. The partitioning or segmentation into the L data blocks is intended to e.g. carry out the spreading. In a same way, the further encoded, interleaved, scrambled and symbol mapped data symbol layers DT-2a, . . . , DT-Ja are partitioned by further second processing units P-PU-2, . . . , P-PU-J into corresponding L further data blocks 2B-1, 2B-2, . . . , 2B-L, . . . , JB-1, JB-2, . . . , JB-L.

According to an alternative embodiment, a number of data blocks may be vary from one data symbol layer DT-1, DT-2, . . . , DT-J to a further data symbol layer DT-1, DT-2, . . . , DT-J. In such a case, the parameter L may be written with an index i with i=1, . . . , J. For simplification, the following description is given for the case of having a same number of data blocks for each data symbol layer DT-1, DT-2, . . . , DT-J. A skilled person may easily adapt the transmitter apparatus TA1 for handling a varying number of data blocks.

Each one of the data blocks 1B-1, 1B-2, . . . , 1B-L is provided to one of third processing units SP-PU-1-1, SP-PU-1-2, . . . SP-PU-1-L for a multicarrier spreading according to one of the techniques known to persons skilled in the art and for a pre-coding such as so-called DFT-precoding (DFT=Discrete Fourier Transformation) for reducing PAPR (PAPR=Peak Average Power Ratio), which is known from 3GPP LTE uplink processing. Thereby, the third processing units SP-PU-1-1, SP-PU-1-2, . . . , SP-PU-1-L output corresponding spread data block 1B-1a, 1B-2a, . . . , 1B-La. The DFT-precoding allows spreading the data symbol vectors $b_j$ by a so-called DFT matrix for getting spread data symbol vectors $C_{j,l}$ with $j \in [1,2, \ldots, J]$ and $l \in [1,2, \ldots, L]$, which may have a same length as the data symbol vectors $b_j$.

Thereby, a PAPR (PAPR=Peak-to-Average Power Ratio) of a time domain signal TDSe (see FIG. 3) or of time domain signals TDSe-1, TDSe-2 (see FIG. 4) can be reduced. In a same way, each of the further data streams or data blocks 2B-1, 2B-2, . . . , 2B-L, . . . , JB-1, JB-2, . . . , JB-L is spread and pre-coded by further third processing units SP-PU-2-1, SP-PU-2-2, . . . SP-PU-J-L, . . . , SP-PU-J-1, SP-PU-J-2, . . . , SP-PU-J-L for obtaining corresponding spread data streams or data blocks 2B-1a, 2B-2a, . . . , 2B-La, JB-1a, JB-2a, . . . , JB-La.

The second processing units P-PU-1, P-PU-2, . . . , P-PU-J and the third processing units SP-PU-1-1, SP-PU-1-2, . . . , SP-PU-1-L perform a mapping of the data symbol layers DT-1, DT-2, . . . , DT-J to different layers such as CDMA codes or IDMA layers (IDMA=Interleave Division Multiple Access), which are described for example in Li Ping et al. "A Simple Approach to Near-Optimal Multiuser Detection: Interleave-Division Multiple-Access", IEEE WCNC 2003, March 2003, page 391-396.

By a fourth processing unit FBG-PU, the spread data blocks 1B-1a, 1B-2a, . . . , 1B-1a, 2B-1a, 2B-2a, . . . , 2B-La, JB-1a, JB-2a, . . . , JB-La are grouped into two or more frequency blocks FB-1, FB-2, . . . , FB-M. The grouping may be done by superimposing the spread data blocks 1B-1a, 1B-2a, . . . , 1B-La, 2B-1a, 2B-2a, . . . , 2B-La, JB-1a, JB-2a, . . . , JB-La of all layers and by a portioning of the superimposed and spread data streams or data blocks into the two or more frequency blocks FB-1, FB-2, . . . , FB-M. Alternatively, the grouping may be done by combining several of the superimposed and spread data blocks 1B-1a, 1B-2a, . . . , 1B-La, 2B-1a, 2B-2a, . . . , 2B-La, JB-1a, JB-2a, . . . , JB-La. Here, the term superposition may denote an addition of signals, while the term combining may mean appending or stacking symbol vectors.

Each of the frequency blocks FB-1, FB-2, . . . , FB-M may be represented by a data symbol vector $d_i = [d_{i,1}, d_{i,2}, \ldots, d_{i,n_i}]$ with $i \in [1,2, \ldots, M]$ and with $n_i$ being a number of subcarriers of a corresponding frequency block FB-1, FB-2, . . . , FB-M. Each of the data symbol vectors $d_i$ may represent for example a single QAM symbol. The subcarriers are for example comprised of complex-valued sinusoids and may be for example OFDM subcarriers (OFDM=Orthogonal Frequency Division Multiplexing).

The frequency blocks FB-1, FB-2, FB-3, . . . , FB-M may be for example sub-bands SB-1, SB-2, SB-3, . . . , SB-M of a predefined frequency range PFR1 and the sub-bands SB-1, SB-2, SB-3, . . . , SB-M may be separated by blocked frequency ranges BA-1, BA-2, BA-3, BA-4, . . . , BA-M, BA-M+1 (see FIG. 5a). One or several of the blocked frequency ranges BA-1, BA-2, BA-3, BA-4, . . . , BA-M, BA-M+1 may be for example guard bands, which are required to fulfil spectral mask requirements. Such spectral mask requirements are for example predefined by a radio communication standard. Alternatively, one or several of the blocked frequency ranges BA-1, BA-2, BA-3, BA-4, . . . , BA-M, BA-M+1 such as the blocked frequency range BA-4 may be for example a predefined frequency range, which is reserved for example for another radio communication standard and which therefore cannot be used by the transmitter apparatus TA.

According to a further embodiment, further frequency blocks FB-1b, FB-2b, FB-3b, FB-4b, FB-5b, FB-6b, . . . , FB-M-3b, FB-M-2b, FB-M-1b, FB-Mb as shown in FIG. 5b may be subsets of further sub-bands SB-1b, SB-2b, . . . , SB-G of a further predefined frequency range PFR2 and the further sub-bands SB-1b, SB-2b, . . . , SB-G may be separated by further blocked frequency ranges BA-1b, BA-2b, BA-3b, . . . , BA-G, BA-G+1 with similar functions as described above with respect to FIG. 5a. The subsets of the further sub-bands SB-1b, SB-2b, . . . , SB-G may be for example LTE PRBs.

This means according to the two embodiments mentioned above, that the number M of frequency blocks is either a number of the separated sub-bands or a total number of subsets of the separated sub-bands to be served by the transmitter apparatus TA1.

Back to FIG. 1, processing functions of the modulator MC-MOD1 may be split into a first processing unit IFFT-PU, a second processing unit D-PU, a first group of mixers MIX-1-1, MIX-1-2, . . . , MIX-1-M, a group of low pass filters LPF-1, LPF-2, . . . , LPF-M, a group of up-sampling processing units US-PU-1, US-PU-2, . . . , US-PU-M and a second group of mixers MIX-2-1, MIX-2-2, . . . , MIX-2-M.

The processing unit IFFT-PU may obtain as input parameters modified versions $d_i' = [0, \ldots, 0, d_{i,1}, d_{i,2}, \ldots, d_{i,n_i}, 0, \ldots, 0]$ of the data symbol vectors $d_i$ by appending one zero or several zero as symbols at the beginning and at the end of the original data symbol vectors $d_i$. A number of the zero symbols at the beginning and a number of the zero symbols at the end of the data symbol vectors $d_i'$ depends on requirements, which a radio frequency signal RFS being transmitted by the transmitter apparatus TA1 should fulfil, such as any frequency-dependant transmission power requirements defined e.g. in a so-called spectral mask. This ensures that the transmission power per considered sub-band stays below a certain value, measured e.g. in dBm.

The first processing unit IFFT-PU executes an IFFT (IFFT=Inverse Fast Fourier Transformation) and generates based on the data symbol vectors $d_i'$ the time domain signal TDS, which inherently includes the frequency blocks FB-1, . . . , FB-M or the frequency blocks FB-1b, . . . , FB-Mb at different frequency positions around the zero frequency. A size N (in terms of discrete frequency points at the input, which is equal to a number of elements of the data symbol vectors $d_i'$) of the IFFT may be given by $N = n_1 + n_2 + \ldots n_M + n_g + n_{fill}$ with $n_g = K \cdot (M-1)$ being equal to a total number of so-called guard subcarriers of all blocked frequency ranges BA-1, BA-2, BA-3, BA-4, . . . , BA-M, BA-M+1 (see embodiment of FIG. 5a) or of all further blocked frequency ranges BA-1b, BA-2b, BA-3b, . . . , BA-G, BA-G+1 (see embodiment of FIG. 5b), K being equal to a number of guard subcarriers of one blocked frequency ranges and $m_{fill}$ being equal to a number for getting N equal to a nearest power of 2. The blocked frequency ranges are used for a protection of the following low pass filters LPF-1, LPF-2, . . . , LPF-M. Therefore, zero values are allocated to the guard subcarriers and thereby the guard subcarriers don't carry any energy. The total number of the guard subcarriers may depend on an edge steepness of the applied filters for generating the advanced multicarrier signal, which may be called UFMC (UFMC=Universal Filtered Multi-Carrier). In a first alternative, frequency shifted filters of a similar type may be applied and thereby a number of guard subcarriers for the various blocked frequency ranges BA-1, . . . , BA-M+1 or BA-1$b$, . . . , BA-G+1 may be identical. In a second alternative, which is straightforward for a skilled person, numbers of guard subcarriers may vary for the various blocked frequency ranges BA-1, . . . , BA-M+1 or BA-1$b$, . . . , BA-G+1. Such different numbers of guard subcarriers may be required for example, when maximum allowed transmission powers for various radio access technologies using the blocked frequency ranges BA-1, . . . , BA-M+1 or BA-1$b$, . . . , BA-G+1 may be different.

The time domain signal TDS may be provided to the second processing unit D-PU for generating duplicates TDS-1, TDS-2, . . . , TDS-M of the time domain signal TDS.

The first group of mixers MIX-1-1, MIX-1-2, . . . , MIX-1-M is used to perform a frequency shift by an up-conversion or a down-conversion for the time domain signals TDS-1, TDS-2, . . . , TDS-M so that for each one of the time domain signals TDS-1, TDS-2, . . . , TDS-M one of the frequency blocks FB-1, . . . , FB-M or the frequency blocks FB-1$b$, . . . , FB-M$b$ may be located around the zero frequency.

The time domain signal TDS-1 may be up-converted or down-converted by a first frequency $f_{1-1}$ using a first mixer MIX-1-1 for generating a first up-converted or down-converted time domain signal TDS-1$b$. In a similar way, the further time domain signals TDS-2, . . . , TDS-M may be up-converted or down-converted by corresponding further first frequencies $f_{1-2}$, . . . $f_{1-M}$ using corresponding further first mixers MIX-1-2, . . . , MIX-1-M for generating corresponding further first up-converted or down-converted time domain signals TDS-2$b$, . . . , TDS-M$b$.

Figure 5:
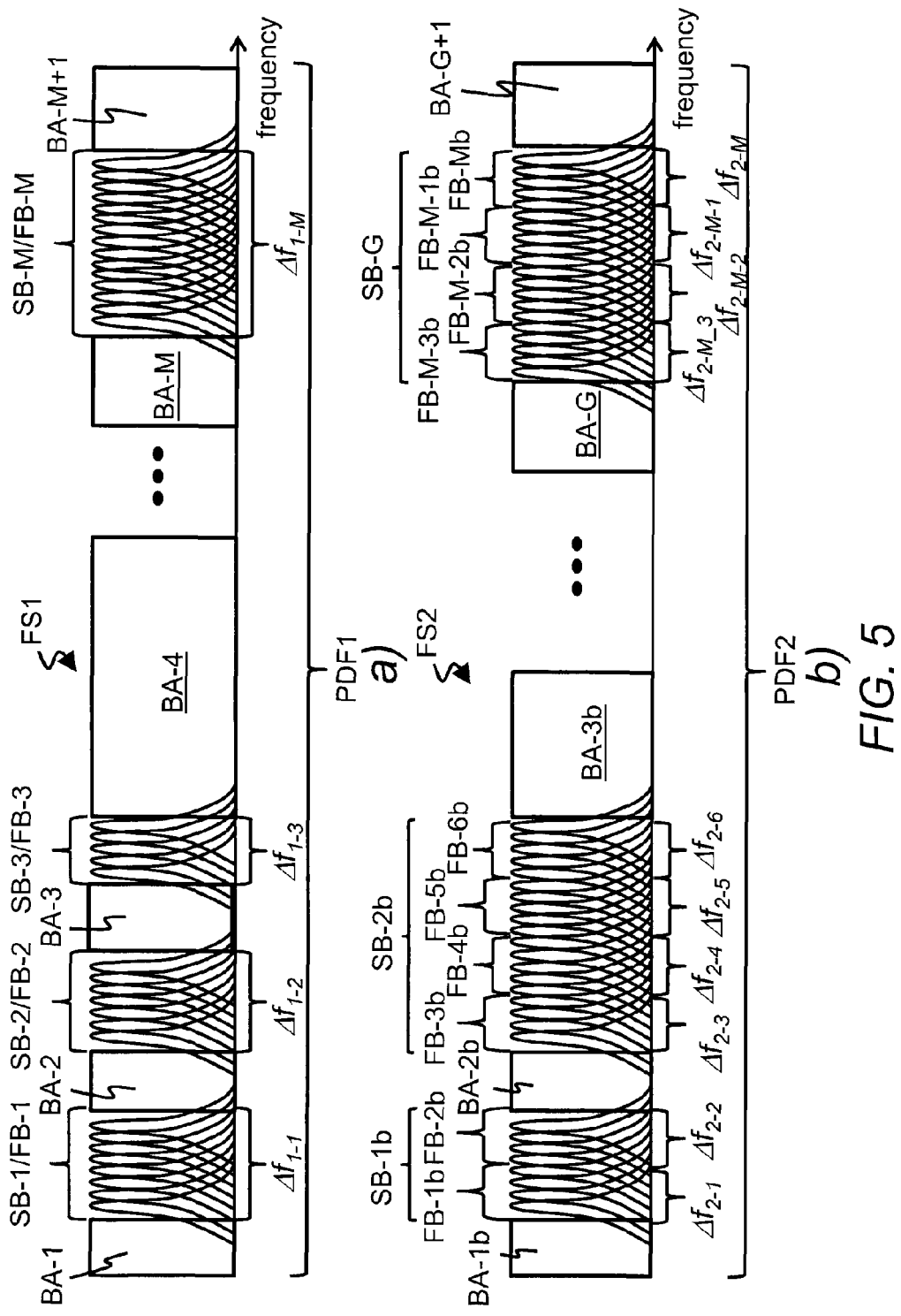
FIG. 5 shows schematically two embodiments for a fragmented spectrum with a mapping of subcarriers of the multicarrier to several frequency blocks, which are separated by respective guard bands or by blocked frequency bands.

The first up-converted or down-converted time domain signal TDS-1$b$ is provided to a low pass filter LPF-1, which generates a filtered time domain signal TDS-1$c$. A cut-off frequency of the first low pass filter LPF-1 may be adapted for example for being equal to half the bandwidth $\Delta f_{1-1}$ or for being slightly larger than the half the bandwidth $\Delta f_{1-1}$ of the first frequency block FB-1 (see FIG. 5$a$) or half a bandwidth $\Delta f_{2-1}$ of the first frequency block FB-1$b$ (see FIG. 5$b$), so that the first low pass filter LPF-1 is able to block and/or attenuate as far as possible all frequency components outside a frequency range of the first frequency block FB-1, FB-1$b$. Alternatively, a different cut-off frequency may be chosen depending on $\Delta f_{1-1}$. Note that with short filter lengths, the first frequency block FB-1 may still radiate some energy into the direct neighbor and second frequency block FB-2. This residual energy can be handled by a corresponding receiver apparatus. In a similar way, the further first up-converted or down-converted time domain signals TDS-2$b$, . . . , TDS-M$b$ are provided to corresponding further low pass filters LPF-2, . . . , LPF-M for generating corresponding further filtered time domain signals TDS-2$c$, . . . , TDS-M$c$. When the frequency blocks FB-1$b$, FB-2$b$, FB-3$b$, FB-4$b$, FB-5$b$, FB-6$b$, . . . , FB-M-3$b$, FB-M-2$b$, FB-M-1$b$, FB-M$b$ are subsets of the sub-bands SB-1$b$, SB-2$b$, . . . , SB-G as shown in FIG. 5$b$, all low pass filters LPF-1, LPF-2, . . . , LPF-M may be identical.

The filtered time domain signal TDS-1$c$ is provided to an up-sampling processing unit US-PU-1 for an interpolation and adaptation of a sampling rate of the filtered time domain signal TDS-1$c$ and for generating an up-sampled time domain signal TDS-1$d$. The sampling rate may be adapted in such a way, that the sampling rate is high enough that the respective bandwidth covers all subsequent frequency shifts. Similarly, the further filtered time domain signals TDS-2$c$, . . . , TDS-M$c$ are provided to corresponding further up-sampling processing units US-PU-2, . . . , US-PU-M for generating corresponding further up-sampled time domain signals TDS-2$d$, . . . , TDS-M$d$.

The up-sampled time domain signal TDS-1$d$ is up-converted by a second frequency $f_{2-1}$ using a second mixer MIX-2-1 for generating a second up-converted time domain signal TDS-1$e$, which is shifted from the zero frequency to the intermediate frequency $f_{2-1}$. In a similar way, the further up-sampled time domain signals TDS-2$d$, . . . , TDS-M$d$ are up-converted by corresponding further second frequencies $f_{2-2}$, . . . , $f_{2-M}$ using corresponding further second mixers MIX-2-2, . . . , MIX-2-M for generating corresponding further second up-converted time domain signals TDS-2$e$, . . . , TDS-M$e$.

Figure 3:
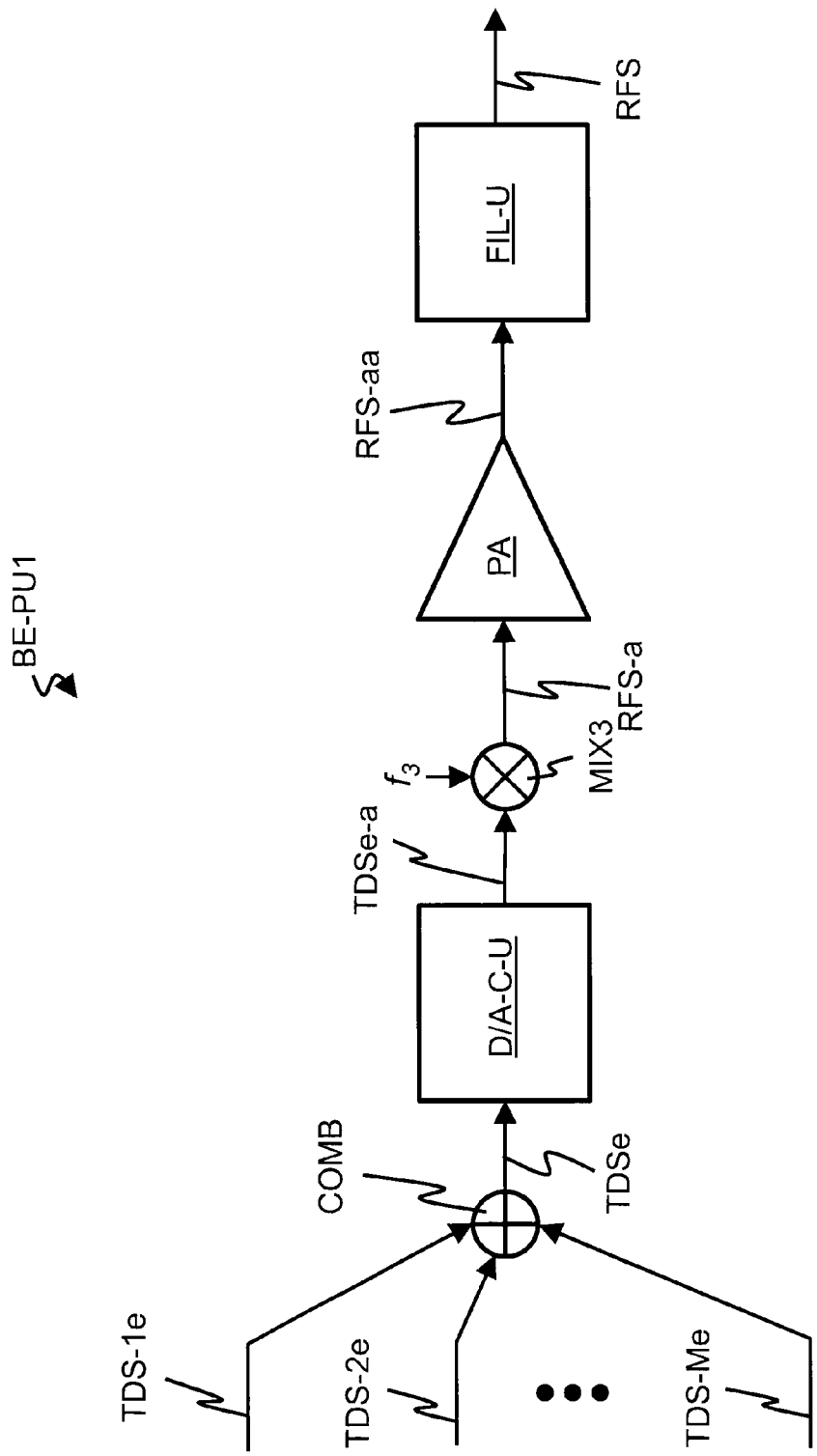
FIG. 3 shows schematically a block diagram of a first alternative of a back end processing unit of the transmitter apparatus according to the first embodiment.

A first embodiment of a back end processing unit BE-PU1 for the back end processing unit BE-PU of FIG. 1 is shown in more detail by FIG. 3. A splitting of processing functions across processing units shown in FIG. 3 is not critical, and as can be understood by those skilled in the art that the number of processing units, the number of processing functions and an allocation of the processing functions to the processing units may vary without departing from the scope of the embodiments of the invention as defined in the appended claims. The back end processing unit BE-PU1 contains a combiner COMB, a digital-to-analogue converter unit D/A-C-U, a mixer MIX3, a power amplifier PA and a filter unit FIL-U such as a duplexer.

The second up-converted time domain signals TDS-1$e$, TDS-2$e$, . . . , TDS-M$e$ are superimposed or added by the combiner COMB for generating a total time domain signal TDSe. The total time domain signal TDS-1$e$ being a digital signal is converted by the digital-to-analogue converter unit D/A-C-U to an analogue time domain signal TDSe-a. The analogue time domain signal TDSe-a, which contains the various frequency blocks FB-1, . . . , FB-M or FB-1$b$, . . . , FB-M$b$ at the various frequency positions $f_{2-1}$, $f_{2-2}$, . . . , $f_{2-M}$, is up-converted by a third frequency $f_3$ using the mixer MIX3 for generating a radio frequency signal RFS-d, which is shifted to a final central frequency position for example in a GHz range. The radio frequency signal RFS-a is amplified by the power amplifier PA for generating an amplified radio frequency signal RFS-aa. The amplified radio frequency signal RFS-aa is filtered by the filter unit FIL-U for generating the radio frequency signal RFS, which is applied to an antenna system being connected to the transmitter apparatus TA1.

Figure 4:
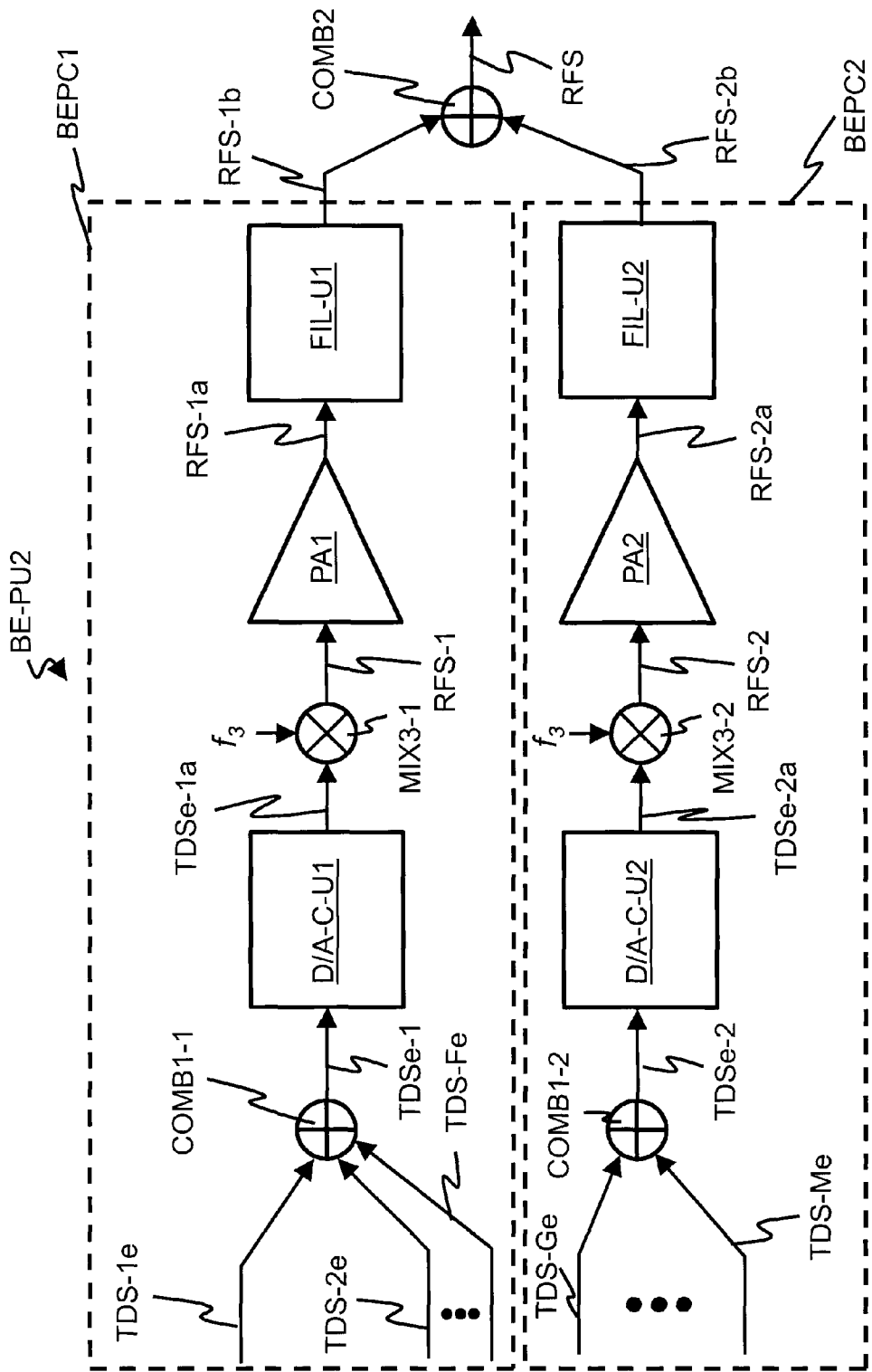
FIG. 4 shows schematically a block diagram of a second alternative of a back end processing unit of the transmitter apparatus according to the first embodiment.

A second embodiment of a further back end processing unit BE-PU2 for the back end processing unit BE-PU of FIG. 1 is shown in more detail by FIG. 4. A splitting of processing functions across processing units shown in FIG. 4 is not critical, and as can be understood by those skilled in the art that the number of processing units, the number of processing functions and an allocation of the processing functions to the processing units may vary without departing from the scope of the embodiments of the invention as defined in the appended claims. The back end processing unit BE-PU2 contains a first radio processing sub-unit BEPC1, a second radio processing sub-unit BEPC2 and a combiner COMB2 such as an RF power combiner/directional coupler (RF=radio frequency), which may be built up by a hybrid circuit. Alternatively, the back end processing unit BE-PU2 may contain more than two radio processing chains.

The first radio processing sub-unit BEPC1 contains a combiner COMB1-1, a digital-to-analogue converter unit D/A-C-U1, a mixer MIX3-1, a power amplifier PA1 and a filter unit FIL-U1 such as a band-pass RF/microwave filter for a first frequency range, which may be realized by cavity filter. In a similar way, the second radio processing sub-unit BEPC2 contains a combiner COMB1-2, a digital-to-analogue converter unit D/A-C-U2, a mixer MIX3-2, a power amplifier PA2 and a filter unit FIL-U2 for a second frequency range.

A first group of the second up-converted time domain signals TDS-1e, TDS-2e, . . . , TDS-Fe is superimposed or added by the combiner COMB1-1 for generating a first time domain signal TDSe-1. In a same way, a second group of the second up-converted time domain signals TDS-Ge, . . . , TDS-Me is superimposed or added by the combiner COMB1-2 for generating a second time domain signal TDSe-1a.

The first time domain signal TDSe-1 being a first digital signal is converted by the digital-to-analogue converter unit D/A-C-U1 to a first analogue time domain signal TDSe-1a. Similarly, the second time domain signal TDSe-2 being a second digital signal is converted by the digital-to-analogue converter units D/A-C-U2 to a second analogue time domain signal TDSe-2a.

The first analogue time domain signal TDSe-1a, which contains the various frequency blocks FB-1, . . . , FB-F or FB-1b, . . . , FB-Fb at the various frequency positions $f_{2-1}$, $f_{2-2}$, . . . , $f_{2-F}$, is up-converted by the third frequency $f_3$ using the mixer MIX3-1 for generating a first radio frequency signal RFS-1, which is thereby shifted to the final central frequency position. In a same way, the second analogue time domain signal TDSe-2a, which contains the various frequency blocks FB-G, . . . , FB-M or FB-Gb, . . . , FB-Mb at the various frequency positions $f_{2-G}$, . . . , $f_{2-M}$, is up-converted by the third frequency $f_3$ using the mixer MIX3-2 for generating a second radio frequency signal RFS-2, which is thereby shifted to the final central frequency position.

The first radio frequency signal RFS-1 is amplified by the power amplifier PA1 for generating a first amplified radio frequency signal RFS-1a. Similarly, the second radio frequency signal RFS-2 is amplified by the power amplifier PA2 for generating a second amplified radio frequency signal RFS-2a.

The first amplified radio frequency signal RFS-1a is filtered by the filter unit FIL-U1 for generating a first filtered radio frequency signal RFS-1b and the second amplified radio frequency signal RFS-2a is filtered by the filter unit FIL-U2 for generating a second filtered radio frequency signal RFS-2b.

The first filtered radio frequency signal RFS-1b and the second filtered radio frequency signal RFS-2b are superimposed or added by the combiner COMB2 for generating the radio frequency signal RFS. The radio frequency signal RFS is applied to the antenna system, which is connected to the transmitter apparatus TA1.

The second embodiment may be preferably applied, when the predefined bandwidth PDF1, PDF2 of the fragmented spectrum (see FIG. 5a and FIG. 5b) is too large to be handled efficiently by the processing units of the back end processing unit BE-PU1, e.g. due to difficulties of proper impedance matching over such a large frequency range, thus having a reduced efficiency factor, and thereby a signal quality would degrade for example at one of the opposing ends of the predefined bandwidth PDF1, PDF2 and therefore would not fulfil predefined requirements such as error-vector magnitude, IQ-imbalance etc.

Figure 6:
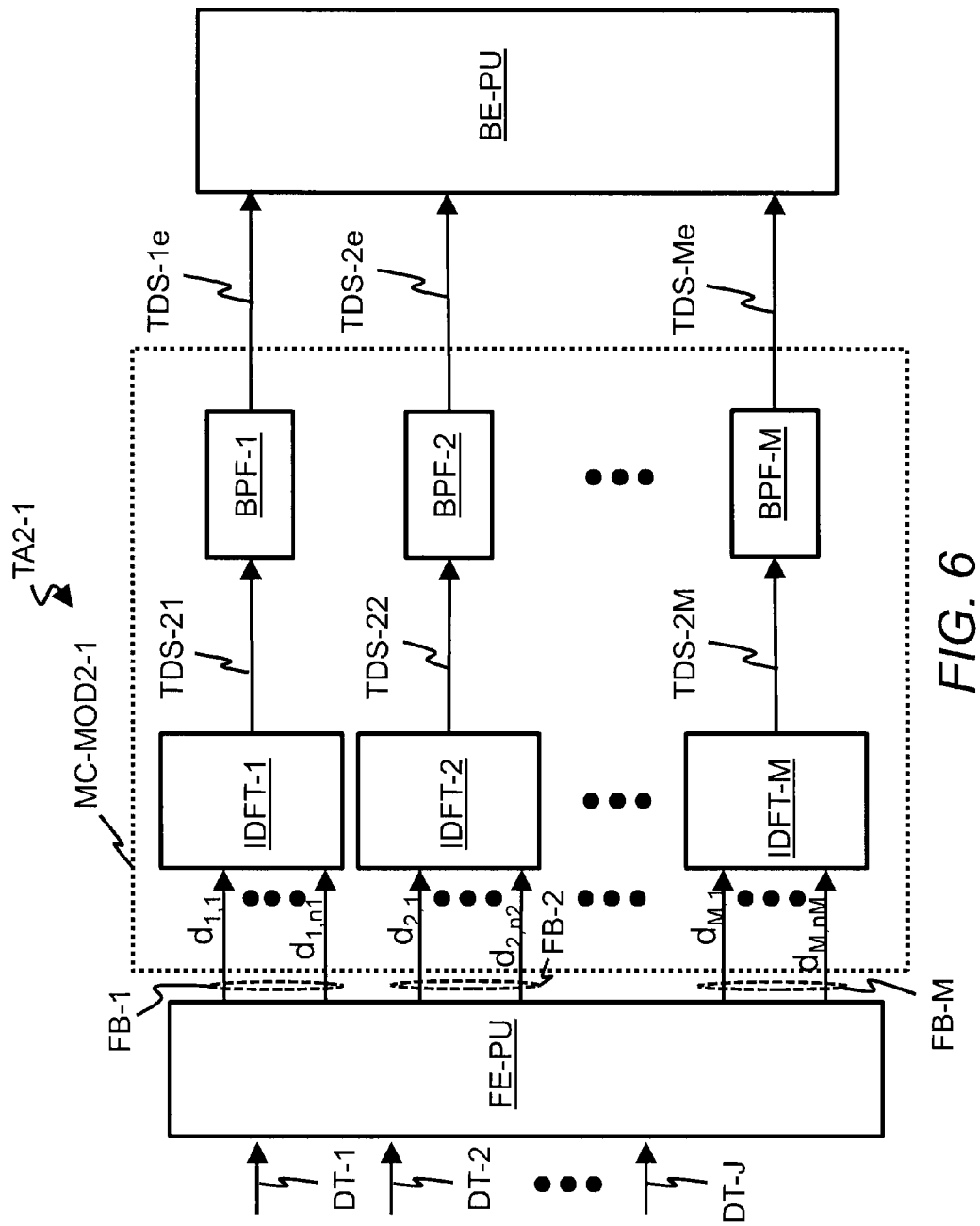
FIG. 6 shows schematically a block diagram of a transmitter apparatus for conditioning a multicarrier signal according to a first alternative of a second embodiment.

FIG. 6 shows schematically a block diagram of a transmitter apparatus TA2-1 for conditioning a multicarrier signal according to a first alternative of a second embodiment, which is characterized by a frequency block-wise IDFT (IDFT=Inverse Discrete Fourier Transformation). A splitting of processing functions across processing units shown in FIG. 6 is not critical, and as can be understood by those skilled in the art that the number of processing units, the number of processing functions and an allocation of the processing functions to the processing units may vary without departing from the scope of the embodiments of the invention as defined in the appended claims. The elements in FIG. 6 that correspond to elements of FIG. 1 have been designated by same reference numerals.

The transmitter apparatus TA2-1 contains the front end processing unit FE-PU, a modulator MC-MOD2-1, which is different to the modulator MC-MOD1, and the back end processing unit BE-PU. Processing functions of the modulator MC-MOD2-1 may be split into a first group of processing units IDFT-1, IDFT-2, . . . , IDFT-M and a second group of band pass filters BPF-1, BPF-2, . . . , BPF-M.

A mathematical description of a transmitted complex-valued time domain signal vector X may be given for example by following equation:

$$x = \sum_{i=1}^{M} F_i V_i d_i$$

with
M: number of frequency blocks such as a number of LTE PRBs,
$F_i$: so-called Toeplitz matrix for number i of the frequency blocks, which contains a bandpass FIR filter (FIR=finite impulse response) for filtering the number i of the frequency blocks,
$V_i$: complex-valued matrix for number i of the frequency blocks for applying an IDFT and for a mapping of the data symbol vector $d_i$ for example onto sinusoidal subcarriers,
$d_i$: data symbol vector for number i of the frequency blocks.

The mathematical description, which is given here for a processing by the transmission apparatuses according to the second embodiment, can be used by approximation also for the transmission apparatuses according to the first embodiment and according to a third embodiment, which is described below. The low pass filters, which are applied within the transmission apparatuses according to the first embodiment and the third embodiment may generate small approximation errors because of a limited barrier effect or limited suppression effect. This may generate small signal errors during the signal conditioning but which are negligible.

The data symbol vector $d_1$ is directly applied without modification (in comparison to the first embodiment) to a first one IDFT-1 of the first group of processing units IDFT-1, IDFT-2, . . . , IDFT-M for performing a first IDFT, which includes the interpolation and the up-conversion, by choosing respective DFT vectors appropriately in terms of length and phase rotations, and for generating a time domain signal TDS-21, which contains the first frequency block FB-1, FB-1b at the frequency $f_{1-2}$. The IDFT may have a dimension of $n_1 \times N$ with $n_1$ being a number of subcarriers to be modulated for the first frequency block FB-1, FB-1b and N being equal to a total number of subcarriers theoretically fitting for a predefined subcarrier distance into the predefined frequency range PDF1, PDF2, when the whole predefined frequency range PDF1, PDF2 would be occupied by subcarriers. In a same way, the data symbol vectors $d_2, \ldots, d_M$ are directly applied without modification to corresponding further processing units IDFT-2, ..., IDFT-M for performing further IDFTs (IDFT=Inverse Discrete Fourier Transformation) including interpolation and up-conversion and for generating further time domain signals TDS-22, ..., TDS-2M, which each contain one of the frequency blocks FB-2, ..., FB-M or FB-2b, ..., FB-Mb at one of the corresponding frequencies $f_{2-2}, \ldots, f_{2-M}$.

The first group of processing units IDFT-1, IDFT-2, ..., IDFT-M enables a separate Fourier transformation for each frequency block FB-1, FB-2, ..., FB-M, which could be a sub-band or a subset of a sub-band in a same as described above for the transmitter apparatus TA1 (see also FIG. 5a and FIG. 5b).

The time domain signal TDS-21 is provided to a first one BPF-1 of the group band pass filters BPF-1, BPF-2, ..., BPF-M, which generates the filtered time domain signal TDS-1e. A bandwidth of the first band pass filter BPF-1 may be adapted to a bandwidth $\Delta f_{1-1}$ for example in a same way as described above according to the transmitter apparatus TA1. of the first frequency block FB-1 (see FIG. 5a) or to a bandwidth $\Delta f_{2-1}$ of the first frequency block FB-1b (see FIG. 5b), so that the first band pass filter BPF-1 is able to block and attenuate all frequency components outside a frequency range of the first frequency block FB-1, FB-1b. In a similar way, the further time domain signals TDS-22, ..., TDS-2M are provided to corresponding further band pass filters BPF-2, ..., BPF-M for generating the further filtered time domain signals TDS-2e, ..., TDS-Me. The filtered time domain signals TDS-1e, TDS-2e, ..., TDS-Me are provided to the back end processing unit BE-PU.

Figure 7:
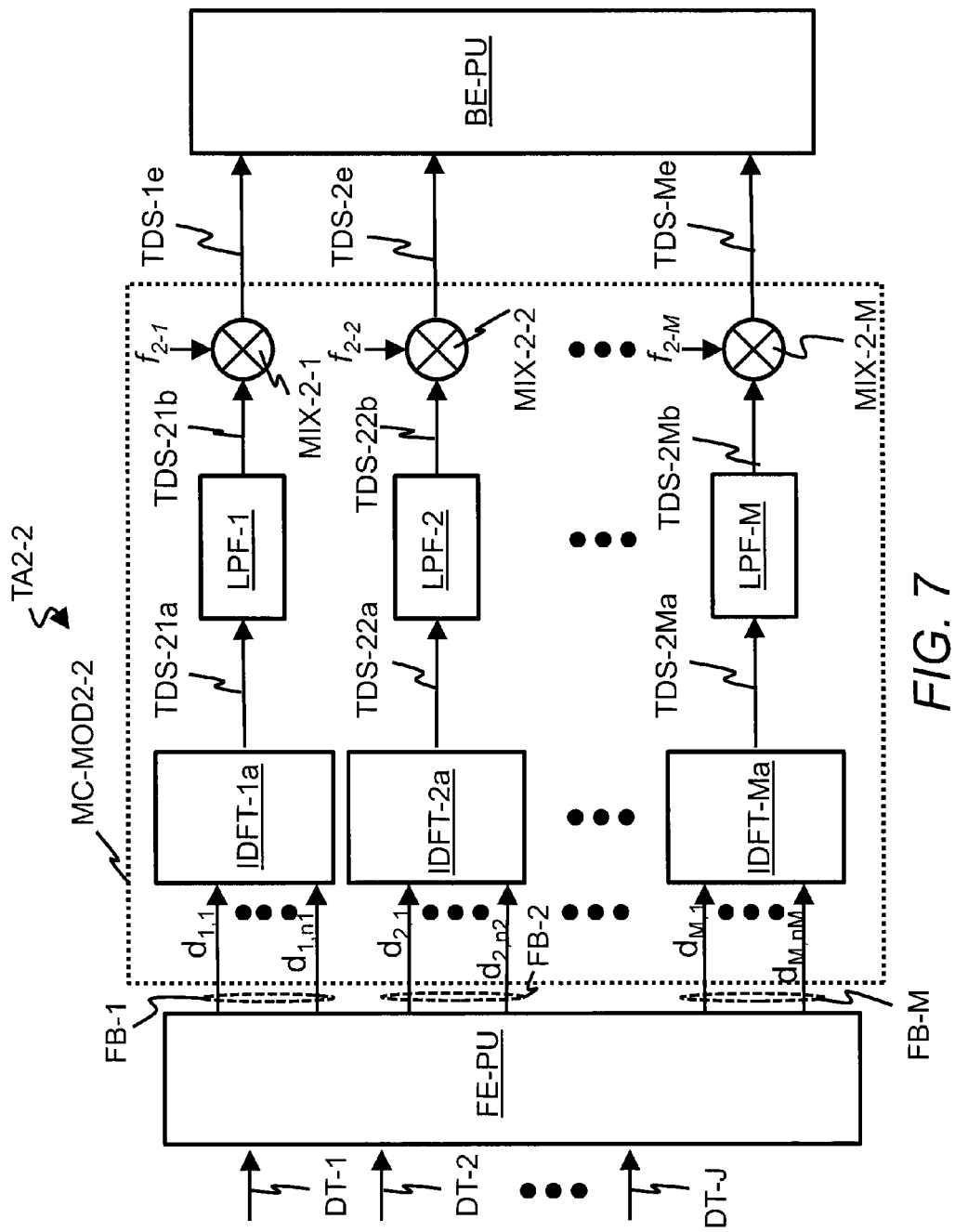
FIG. 7 shows schematically a block diagram of a transmitter apparatus for conditioning a multicarrier signal according to a second alternative of the second embodiment.

FIG. 7 shows schematically a block diagram of a transmitter apparatus TA2-2 for conditioning a multicarrier signal according to a second alternative of the second embodiment. A splitting of processing functions across processing units shown in FIG. 7 is not critical, and as can be understood by those skilled in the art that the number of processing units, the number of processing functions and an allocation of the processing functions to the processing units may vary without departing from the scope of the embodiments of the invention as defined in the appended claims. The elements in FIG. 7 that correspond to elements of FIG. 1 or FIG. 6 have been designated by same reference numerals.

The transmitter apparatus TA2-2 contains the front end processing unit FE-PU, a modulator MC-MOD2-2, which is different to the modulator MC-MOD2-1, and the back end processing unit BE-PU. Processing functions of the modulator MC-MOD2-2 are split into a first group of processing units IDFT-1a, IDFT-2a, ..., IDFT-Ma, a second group of the low pass filters LPF-1, LPF-2, ..., LPF-M, and a third group of the mixers MIX-2-1, ..., MIX-2-M.

The data symbol vector $d_1$ is directly applied without modification to a first one IDFT-1a of the first group of processing units IDFT-1a, IDFT-2a, ..., IDFT-Ma for performing a first IDFT, which already includes the interpolation similar to the first alternative of the second embodiment. The first IDFT generates a time domain signal TDS-21a, which contains the first frequency block FB-1 around a frequency index zero. This means, that the processing unit IDFT-1a in comparison to the processing unit IDFT-1 does not include the up-conversion to the frequency $f_{1-2}$. In a same way, the data symbol vectors $d_2, \ldots, d_M$ are directly applied without modification to corresponding further processing units IDFT-2a, ..., IDFT-Ma for performing further IDFTs (IDFT=Inverse Discrete Fourier Transformation) and for generating further time domain signals TDS-22a, ..., TDS-2Ma, which contains corresponding frequency blocks FB-1, ..., FB-M or FB-1b, ..., FB-Mb at the zero frequency.

The first group of processing units IDFT-1a, IDFT-2a, ..., IDFT-Ma enables a separate Fourier transformation for each frequency block FB-1, ..., FB-M or FB-1b, ..., FB-Mb, which could be a sub-band or a subset of a sub-band in a same way as described above for the transmitter apparatus TA1 and the transmitter apparatus TA2-1 (see also FIG. 5a and FIG. 5b).

The time domain signal TDS-21a is provided to the low pass filter LPF-1, which generates a filtered time domain signal TDS-21b. In a similar way, the further time domain signals TDS-22a, ..., TDS-2Ma are provided to a corresponding one of the further low pass filters LPF-2, ..., LPF-M for generating further filtered time domain signals TDS-22b, ..., TDS-2Mb.

When the frequency blocks FB-1b, ..., FB-Mb are subsets of the sub-bands, the processing units IDFT-1a, IDFT-2a, ..., IDFT-Ma may be identical and also the low pass filters LPF-1, LPF-2, ..., LPF-M may be identical.

The filtered time domain signal TDS-21b is up-converted by the frequency $f_{2-1}$ using the mixer MIX-2-1 for generating the up-converted time domain signal TDS-1e. In a similar way, the further filtered time domain signals TDS-22b, ..., TDS-2Mb are up-converted by corresponding further frequencies $f_{2-2}, \ldots, f_{2-M}$ using the further mixers MIX-2-2, ..., MIX-2-M for generating the further up-converted time domain signals TDS-2e, ..., TDS-Me.

The up-converted time domain signals TDS-1e, TDS-2e, ..., TDS-Me are provided to the back end processing unit BE-PU.

Figure 8:
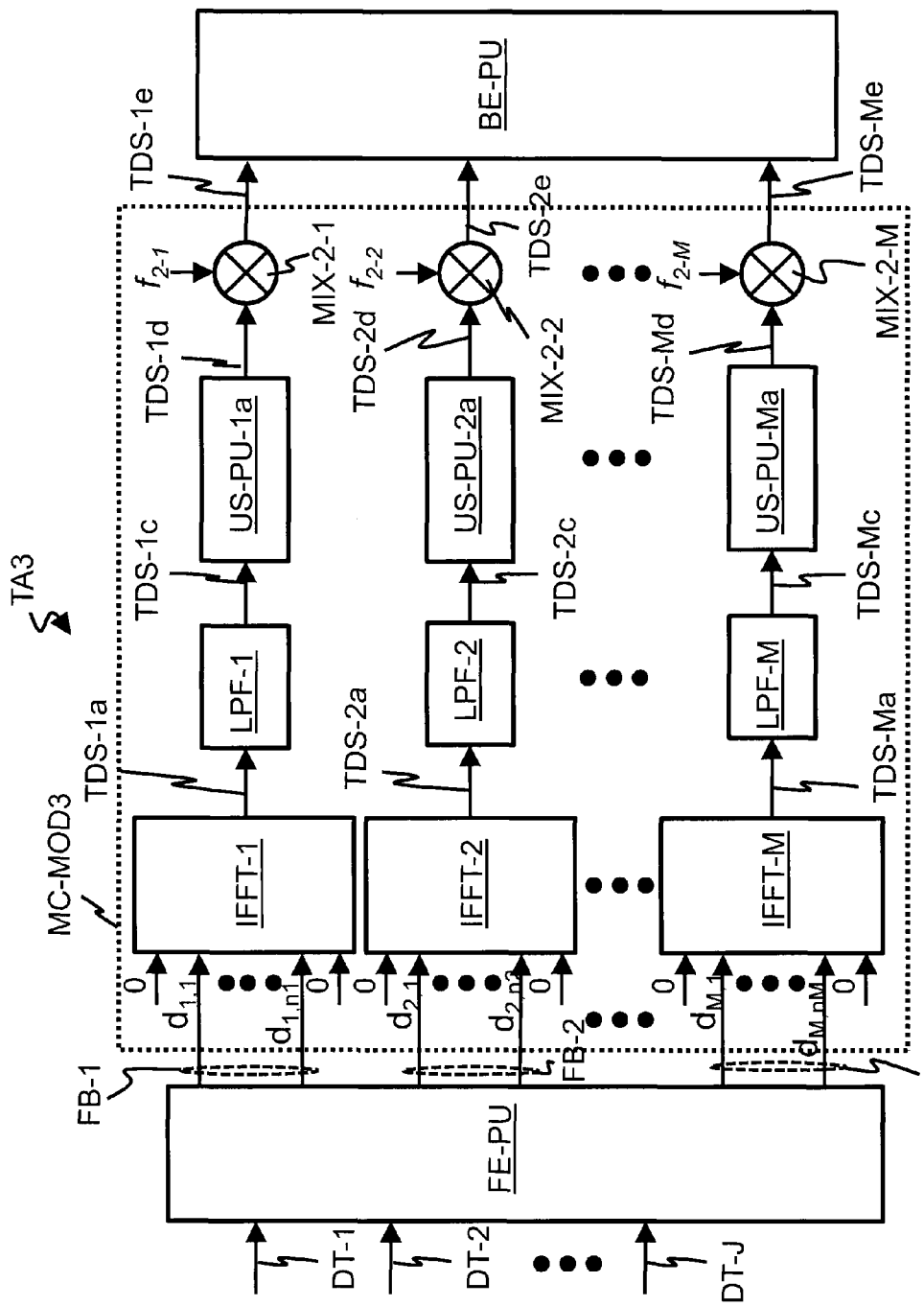
FIG. 8 shows schematically a block diagram of a transmitter apparatus for conditioning a multicarrier signal according to a third embodiment.

FIG. 8 shows schematically a block diagram of a transmitter apparatus TA3 for conditioning a multicarrier signal according to a third embodiment. A splitting of processing functions across processing units shown in FIG. 8 is not critical, and as can be understood by those skilled in the art that the number of processing units, the number of processing functions and an allocation of the processing functions to the processing units may vary without departing from the scope of the embodiments of the invention as defined in the appended claims. The elements in FIG. 7 that correspond to elements of FIG. 1 have been designated by same reference numerals.

The transmitter apparatus TA3 contains an input for the data symbol layers DT-1, DT-2, ..., DT-J, the front end processing unit FE-PU, a modulator MC-MOD3 (indicated in FIG. 8 by a dotted line) for modulation and further processing of frequency blocks FB-1, ..., FB-M (see FIG. 5a) or FB-1b, ..., FB-Mb (see FIG. 5b), the back end processing unit BE-PU and the output for the radio frequency signals RFS.

Processing functions of the modulator MC-MOD3 may be split into a group of processing units IFFT-1, IFFT-2, ... IFFT-M, the group of low pass filters LPF-1, LPF-2, ..., LPF-M, a group of up-sampling processing units US-PU-1a, US-PU-2a, ..., US-PU-Ma and the group of mixers MIX-2-1, MIX-2-2, ..., MIX-2-M.

A first one IFFT-1 of the group of processing units IFFT-1, IFFT-2, ... IFFT-M may obtain as an input parameter the modified version $d_1'=[0, \ldots, 0, d_{1,1}, d_{1,2}, \ldots, d_{1,n_1}, 0, \ldots, 0]$ of the data symbol vectors $d_1$ by appending similar to the first embodiment one zero or several zero as symbols at the beginning and at the end of the original data symbol vectors $d_1$. The first processing unit IFFT-1 executes a first IFFT and generates based on the data symbol vector $d_1'$ a first time domain signal TDS-1a, which inherently includes the frequency block FB-1 or FB-1*b* at the zero frequency. A size $N_1$ of the first IFFT may be given by $N_1=n_1+n_{fill,1}$. This means that $N_1$ is a number equal to a smallest power of two, which is larger than a number of modulated subcarriers of a respective frequency block FB-1, . . . , FB-M or FB-1*b*, . . . , FB-Mb under a condition, that a number of zero subcarriers added by the term $n_{fill,1}$ is sufficient for ensuring a proper subsequent low-pass filtering, such that the rate is high enough that the low pass-filtering operation can be done with a filter order high enough to have sufficient attenuation at the band edges. This ensures that the approximation error by generating the signal in this way becomes negligible. In a similar way, the further processing units IFFT-2, . . . , IFFT-M perform further IFFTs for the corresponding modified data symbol vectors $d_1'$, . . . , $d_M'$ for obtaining further time domain signals TDS-2*a*, . . . , TDS-Ma, which each inherently includes one of the frequency blocks FB-2, . . . , FB-M or FB-2*b*, . . . , FB-Mb at the zero frequency.

The first time domain signal TDS-1*a* is provided to the low pass filter LPF-1, which generates the filtered time domain signal TDS-1*c*. In a similar way, the further time domain signals TDS-2*a*, . . . , TDS-Ma are provided to the further low pass filters LPF-2, . . . , LPF-M for generating corresponding further filtered time domain signals TDS-2*c*, . . . , TDS-Mc. When the frequency blocks FB-1*b*, . . . , FB-Mb are subsets of the sub-bands SB-1*b*, SB-2*b*, . . . , SB-G as shown in FIG. 5*b*, all low pass filters LPF-1, LPF-2, . . . , LPF-M may be identical.

The filtered time domain signal TDS-1*c* is provided to an up-sampling processing unit US-PU-1*a* for an interpolation and adaptation of a sampling rate of the filtered time domain signal TDS-1*c* to a predefined sampling rate, which fits to the predefined bandwidth PDF1, PDF2 and for generating the up-sampled time domain signal TDS-1*d*. Similarly, the further filtered time domain signals TDS-2*c*, . . . , TDS-Mc are each provided to corresponding further up-sampling processing units US-PU-2*a*, . . . , US-PU-Ma for an interpolation and adaptation of a corresponding sampling rate to the predefined sampling rate and for generating the further up-sampled time domain signals TDS-2*d*, . . . , TDS-Md.

According to an alternative embodiment not shown in FIG. 8, the time domain signals TDS-2*a*, . . . , TDS-Ma may already contain the interpolation via padding of zero subcarriers and therefore the domain signals TDS-2*a*, . . . , TDS-Ma have a same overall bandwidth, which is equal to the predefined bandwidth PDF1, PDF2.

The further processing of the transmitter apparatus TA3 may be identical to the processing of the transmitter apparatus TA1.

Figure 9:
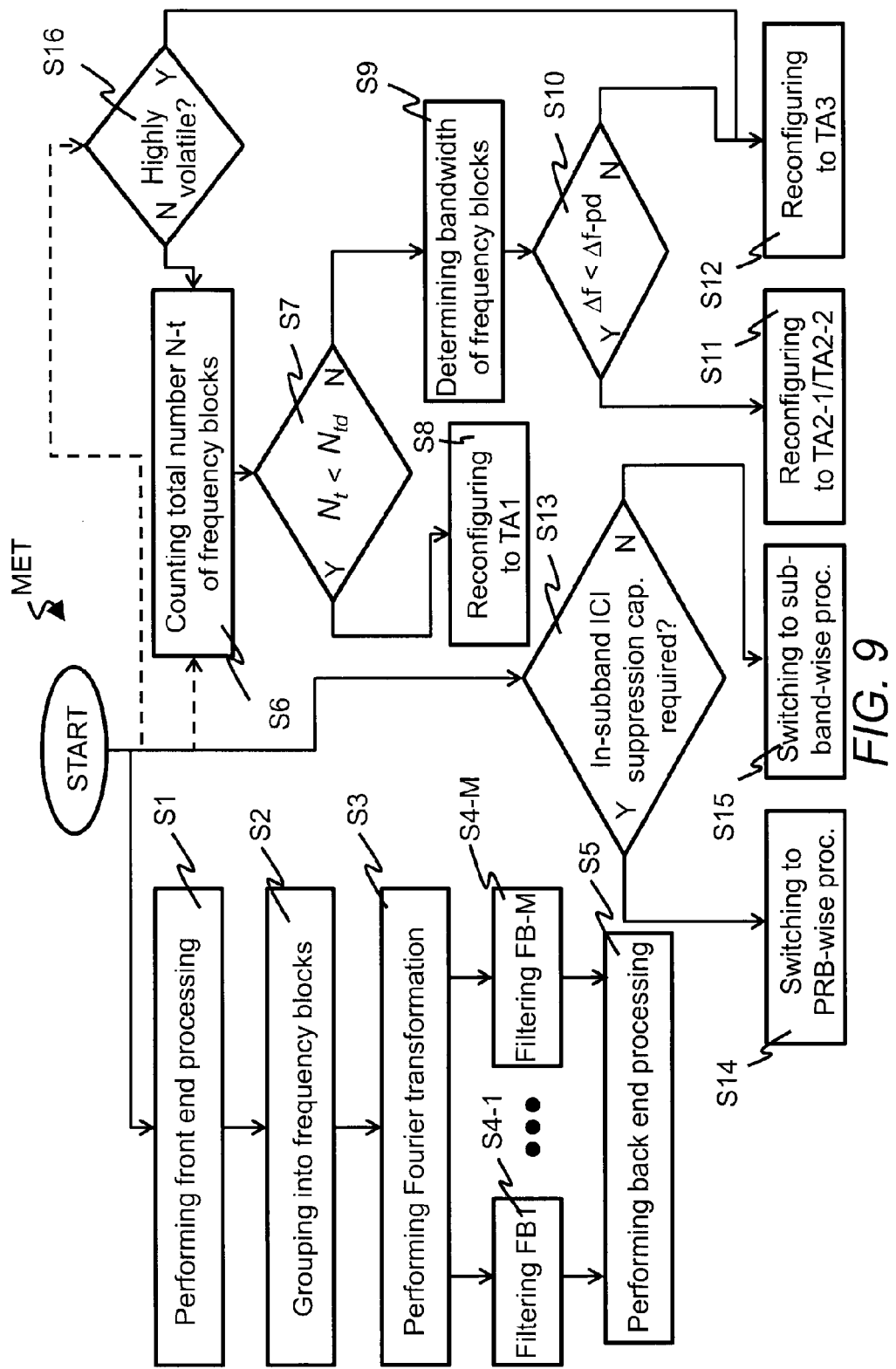
FIG. 9 shows schematically a flow diagram of a method for conditioning a multicarrier signal according to the first, second, third, and a fourth embodiment.

FIG. 9 shows a flow diagram of a method MET for conditioning the multicarrier signal according to the first, second, and third embodiment and according to a fourth embodiment, which is described below.

The number of the steps for performing the method MET is not critical, and as can be understood by those skilled in the art that the number of the steps and the sequence of the steps may vary without departing from the scope of the embodiments of the invention as defined in the appended claims.

The method MET may be executed or performed by the transmitter apparatus TA1, TA2-1, TA2-2, TA3 or by a further transmitter apparatus TA4, which is described below with respect to FIG. 10. The method MET may be started for example when the transmitter apparatus TA1, TA2-1, TA2-2, TA3, TA4 is switched from an operation within a single sub-band to an operation with a fragmented spectrum such as shown in FIG. 5*a* or FIG. 5*b*.

In a first step S1, a front end processing may be performed as described above with respect to FIG. 2.

In a further step S2, the subcarriers of the multicarrier signal may be grouped or allocated to the frequency blocks FB-1, . . . , FB-M (see FIG. 5*a*) or FB-1*b*, . . . FB-Mb (see FIG. 5*b*).

In a next step S3, a Fourier transformation such as a single IFFT for all frequency blocks FB-1, . . . , FB-M or FB-1*b*, . . . FB-Mb, an IFFT for each frequency block FB-1, . . . , FB-M or FB-1*b*, . . . FB-Mb or an IDFT for each frequency block FB-1, . . . , FB-M or FB-1*b*, . . . FB-Mb may be executed.

In further separate steps S4-1 to S4-M, each of the frequency blocks FB-1, . . . , FB-M or FB-1*b*, . . . FB-Mb is filtered for side lob suppression by either low pass filtering or band pass filtering depending on the kind of Fourier transformation (see above with respect to the first, second and third embodiment).

Further sub-steps such as up-sampling or up-converting may be performed depending on the kind of Fourier transformation (see above with respect to the first, second and third embodiment).

In a next step S5, a back end processing may be performed as described above with respect to FIG. 3 and FIG. 4.

By further optional steps S6 to S12, a reconfiguration from one of the transmitter apparatuses TA1, TA2-1, TA2-2, TA3 to another of the transmitter apparatuses TA1, TA2-1, TA2-2, TA3 may be executed. The steps S6 to S12 may be executed for example each time, when at least one sub-band of the fragmented spectrum FS1, FS2 shown in FIG. 5*a* and FIG. 5*b* is changed. The reconfiguration is mainly driven by a complexity of the IFFT/IDFT with respect to a total number $N_t$ of the frequency blocks FB-1, . . . , FB-M or FB-1*b*, . . . , FB-Mb to be handled by the IFFT/IDFT and with respect to sizes of the frequency bandwidths $\Delta f_{1-i}$ or $\Delta f_{2-i}$ with (i=1, . . . , M) of the frequency blocks FB-1, . . . , FB-M or FB-1*b*, . . . , FB-Mb. By step S6 the total number $N_t$ of the frequency blocks FB-1, . . . , FB-M or FB-1*b*, . . . , FB-Mb may be counted.

In a further step S7 it is verified, whether the total number $N_t$ is smaller than a predefined total number $N_{pd}$. The predefined total number $N_{pd}$ depends for example on the threshold where a weighted total number of multiplications and additions in the signal generation and signal conditioning at the transmitter apparatus according to the first embodiment exceed a weighted total number of multiplications and additions in the signal generation and signal conditioning at the transmitter apparatuses according to the first embodiment and the third embodiment. When the total number $N_t$ is smaller than the predefined total number $N_{pd}$ step S8 may be a next step. When else the total number $N_t$ is equal to or larger than the predefined total number $N_{pd}$ step S9 may be a next step.

By the step S8, the transmitter apparatus TA4 may perform a reconfiguration to the transmitter apparatus TA1 for example by techniques known for example from software-defined radio, e.g. by loading another software package or by branching within the loaded software package into another processing type.

In the step S9, a frequency bandwidth Δf of the frequency blocks FB-1, . . . , FB-M or FB-1*b*, . . . , FB-Mb may be determined. Therefore, the transmitter apparatus TA4 may equalize the frequency bandwidth Δf with a largest frequency bandwidth of the frequency blocks FB-1, . . . , FB-M or FB-1*b*, . . . , FB-Mb. Alternatively, the transmitter apparatus TA4 may calculate an average frequency bandwidth of the frequency blocks FB-1, . . . , FB-M or FB-1$b$, . . . , FB-M$b$ and may equalize the frequency bandwidth $\Delta f$ with the average frequency bandwidth.

In a further step S10 it is verified, whether the frequency bandwidth $\Delta f$ is smaller than a predefined frequency bandwidth $\Delta f_{pd}$. The predefined frequency bandwidth $\Delta f_{pd}$ depends for example on a threshold where a weighted total number of multiplications and additions in the signal generation and signal conditioning by the transmitter apparatus according to the second embodiment exceed a weighted total number of multiplications and additions in the signal generation and signal conditioning by the transmitter apparatus according to the third embodiment. When the frequency bandwidth $\Delta f$ is smaller than the predefined frequency bandwidth $\Delta f_{pd}$ step S11 may be a next step. When else the frequency bandwidth $\Delta f$ is equal to or larger than the predefined frequency bandwidth $\Delta f_{pd}$ step S12 may be a next step.

By the step S1, the transmitter apparatus TA4 may perform a reconfiguration to the transmitter apparatus TA2-1 or to the transmitter apparatus TA2-2.

In the step S12, the transmitter apparatus TA4 may perform a reconfiguration to the transmitter apparatus TA3.

By even further optional steps S13 to S15, the frequency block-wise processing of the frequency blocks FB-1, . . . , FB-M or FB-1$b$, . . . , FB-M$b$ can be adapted either to a separate parallel processing of the sub-bands SB-1, SB-2, . . . , SB-M or to a separate parallel processing of the subsets FB-1$b$, FB-2$b$, . . . , FB-M$b$ of the sub-bands SB-1$b$, SB-2$b$, . . . , SB-G.

By the step S13 it may be verified, whether a so-called in-subband ICI suppression capability may be required. In-subband ICI suppression capabilities are for example required in case of multiple mobile stations, which are using a same sub-band on an uplink to a base station. Further criteria for a decision on a type of the frequency blocks FB-1, . . . , FB-M or FB-1$b$, . . . , FB-M$b$ are high tolerated CFOs (CFO=Carrier Frequency Offset between the base station and one of the mobile stations), e.g. being above rather strict CFO requirement definitions such as defined by 3GPP TS36.521, and/or high Doppler spreads, e.g. resulting from high speed velocities (e.g. by cars on a highway or by high-speed trains), and/or relaxed synchronicity of mobile stations within the same sub-band. An evaluation or verification algorithm may for example apply a weighted combination of the criteria described above.

When the in-subband ICI suppression capability is required step S14 may be a next step. When else the in-subband ICI suppression capability is not required step S15 may be a next step.

By the step S13, the transmitter apparatus TA1, TA2, TA3, TA4 may switch to the separate and parallel processing of the subsets FB-1$b$, FB-2$b$, . . . , FB-M$b$ (e.g. LTE PRBs) of the sub-bands SB-1$b$, SB-2$b$, . . . , SB-G.

In step S14, the transmitter apparatus TA1, TA2, TA3, TA4 may switch to the separate and parallel processing of the sub-bands SB-1, SB-2, . . . , SB-M.

By a further optional step 516 it may be verified, whether a usability of the first frequency block FB-1, FB-1$b$ and/or the at least a second frequency block FB-2, . . . , FB-M, FB-2$b$, FB-M$b$ for a predefined radio access technology or for a predefined radio communication system changes periodically. The fragmented spectrum FS1, FS2 may be for example highly volatile within the several hours or within the day when a so-called opportunistic access approach is applied. In such a case, the predefined radio communication system or the predefined radio access technology isn't operated continuously within a specific frequency sub-band or several specific frequency sub-bands, e.g. the radio communication system or the radio access technology will be only operated at day time and not during the night. This means that during the night the specific frequency sub-band or the specific frequency sub-bands can be used by another radio communication system or another radio access technology.

When the fragmented spectrum FS1, FS2 is highly volatile, the step S12 may be a next step. When else the fragmented spectrum FS1, FS2 is not highly volatile the step S6 may be the next step.

Figure 10:
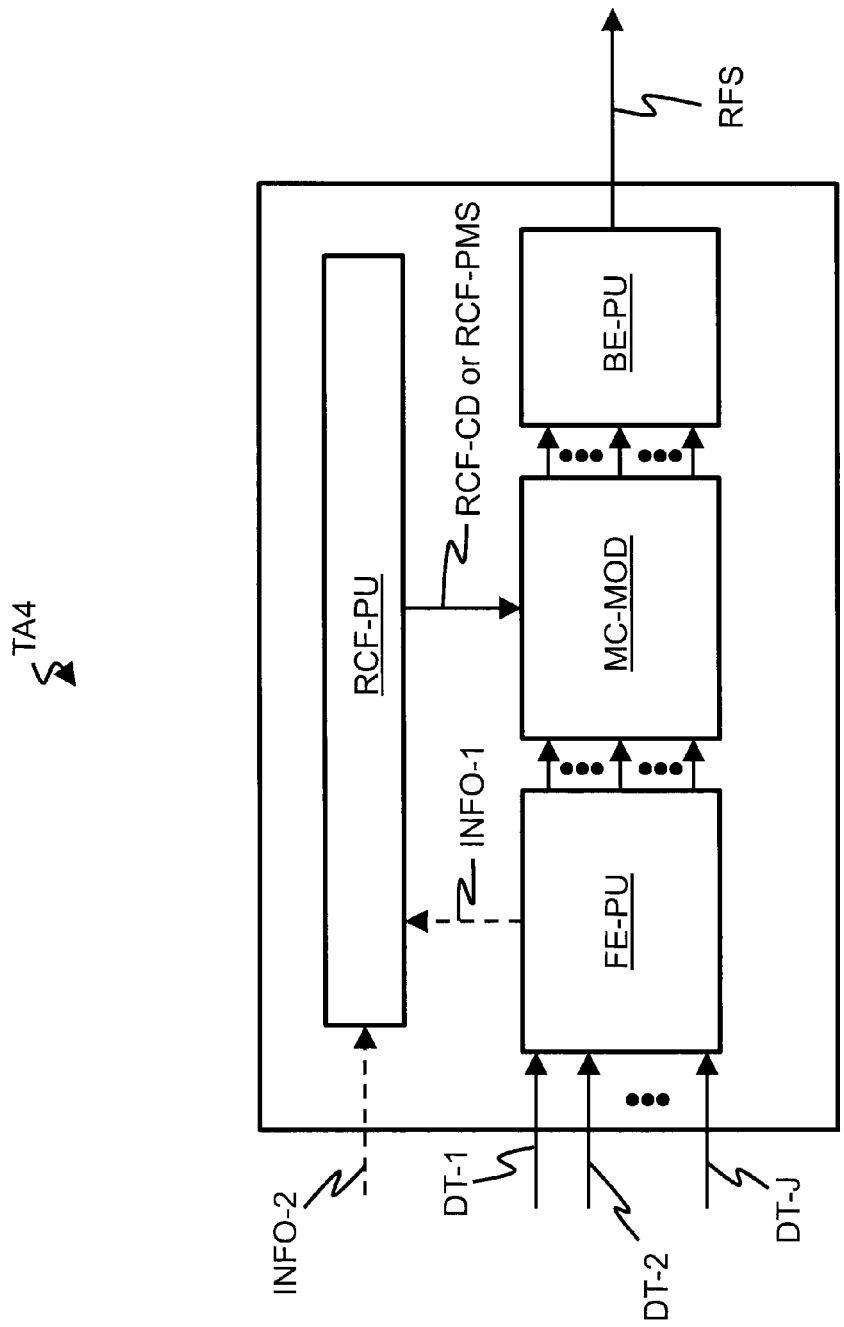
FIG. 10 shows schematically a block diagram of a reconfigurable transmitter apparatus for conditioning a multicarrier signal according to the fourth embodiment.

FIG. 10 shows schematically a block diagram of a transmitter apparatus TA4 for conditioning a multicarrier signal according to a fourth embodiment. A splitting of processing functions across processing units shown in FIG. 10 is not critical, and as can be understood by those skilled in the art that the number of processing units, the number of processing functions and an allocation of the processing functions to the processing units may vary without departing from the scope of the embodiments of the invention as defined in the appended claims.

The transmitter apparatus TA4 contains an input for the data symbol layers DT-1, DT-2, . . . , DT-J, the front-end processing unit FE-PU (see FIG. 2 as an example), a modulator unit MC-MOD, the back-end processing unit BE-PU (see FIG. 3 and FIG. 4 as two examples), a reconfiguration processing unit RCF-PU and an output for the radio frequency signals RFS. The modulator unit MC-MOD may be reconfigurable to one of the modulators MC-MOD1, MC-MOD2-1, MC-MOD2-2 and MC-MOD3.

The reconfiguration processing unit RCF-PU may be for example a processor or controller, which executes the steps S6 to S15 of the method MET. For being able to execute the steps S6 to S12, the reconfiguration processing unit RCF-PU may need information INFO-1, INFO-2 such as the total number $N_t$ of the frequency blocks FB-1, . . . , FB-M or FB-1$b$, . . . , FB-M$b$ and the frequency bandwidths $\Delta f_{1-i}$ or $\Delta f2-i$ with i=1, . . . , M of the frequency blocks FB-1, . . . , FB-M or FB-1$b$, . . . , FB-M$b$. The reconfiguration processing unit RCF-PU may for example either obtain the information INFO-1 from the front-end processing unit FE-PU or may obtain the information INFO-2 from a higher layer entity such as a multiple access control unit and/or a radio link control unit.

When the reconfiguration processing unit RCF-PU may determine a preferred configuration for the modulator unit MC-MOD, which is different to a currently applied configuration, the reconfiguration processing unit RCF-PU may send to the modulator unit MC-MOD a reconfiguration command RCF-CD containing a type of transmitter apparatus to be used by the modulator unit MC-MOD. In such a case the modulator unit MC-MOD may itself execute the reconfiguration to one of the transmitter apparatuses TA1, TA2-1, TA2-2, TA3.

Alternatively, the processing unit RCF-PU may directly send to the modulator unit MC-MOD —similar to a firmware update—the reconfiguration parameters RCF-PMS.

The processing unit RCF-PU may be also adapted for providing a switching between a filtering of the one or several sub-bands SB-1, . . . , SB-M and a filtering of the at least two subunits FB-1$b$, . . . , FB-M$b$ of one or several sub-bands SB-1$b$, . . . , SB-G. This means, that the filtering of the at least two subunits FB-1$b$, . . . , FB-M$b$ can be also done for a single sub-band without requiring a fragmented spectrum such as shown in FIG. 5$b$.

Figure 11:
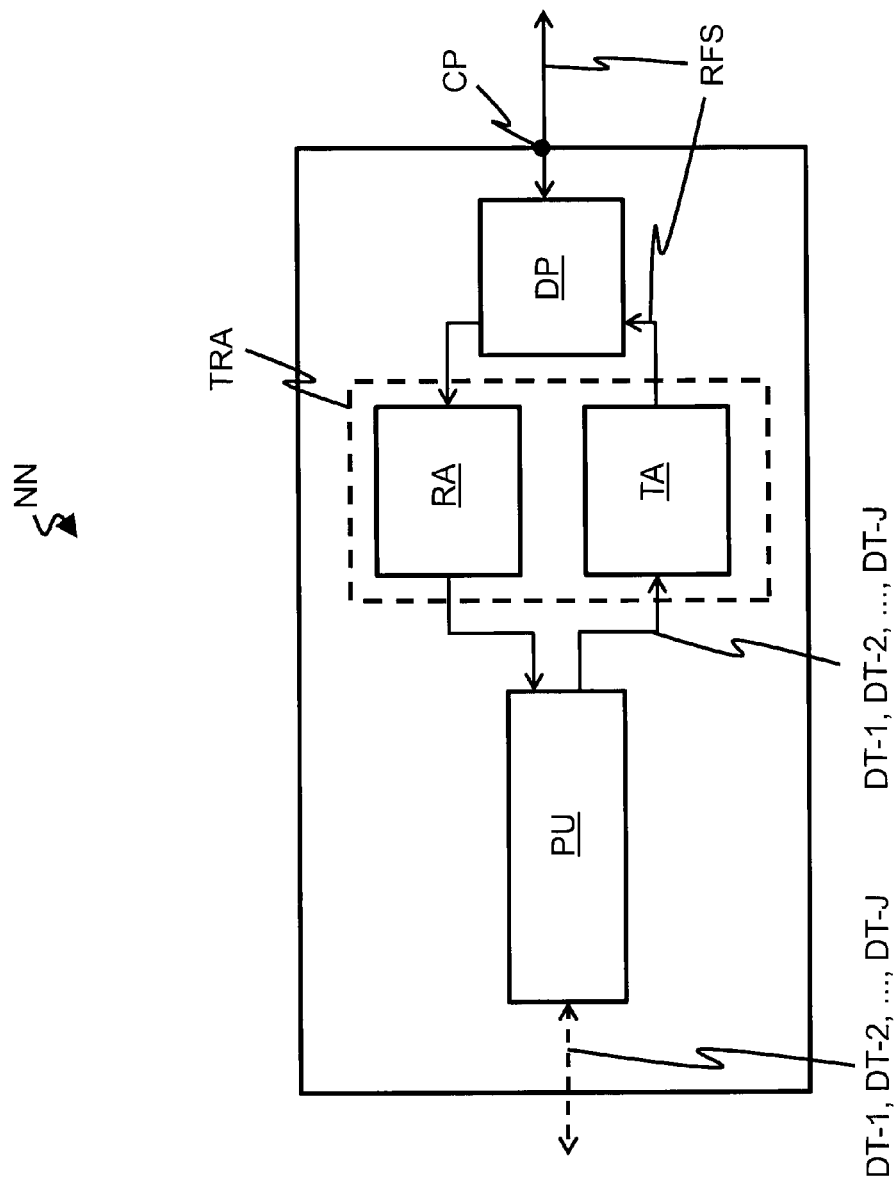
FIG. 11 shows schematically a block diagram of a network node, which contains a transmitter apparatus according to the first, second, third, and fourth embodiment.

FIG. 11 shows schematically a block diagram of a network node NN, which may execute the method MET (see FIG. 9). A splitting of processing functions across processing units shown in FIG. 11 is not critical, and as can be understood by those skilled in the art that the number of processing units, the number of processing functions and an allocation of the processing functions to the processing units may vary without departing from the scope of the embodiments of the invention as defined in the appended claims. The network node NN may be for example a base station, a mobile station or a relay station.

The term "base station" may be considered synonymous to and/or referred to as a base transceiver station, access point base station, access point, macro base station, micro base station, femto base station, pico base station etc. and may describe equipment that provides wireless connectivity via one or more radio links to one or more mobile stations.

The term "mobile station" may be considered synonymous to, and may hereafter be occasionally referred to, as a mobile unit, mobile user, access terminal, user equipment, subscriber, user, remote station etc. The mobile station RAN1-MS may be for example a cellular telephone, a portable computer, a pocket computer, a hand-held computer, a personal digital assistant or a vehicle-mounted mobile device such as a car-mounted mobile device.

The term "relay station" may be considered synonymous to and/or referred to as an electronic radio communication device that receives a signal and retransmits a different signal not only at a higher level or higher power, but also at a different frequency and/or different time slot and/or spreading code, to increase capacity in a wireless access network and to improve wireless link performance.

The network node NN may contain a connection point CP for a fibre connection or a wire connection to an antenna system, a duplexer DP, a receiver apparatus RA, a transmitter apparatus TA and a processing unit PU. The receiver apparatus RA and the transmitter apparatus TA may be for example parts of a transceiver apparatus TRA or may be separate units. The transmitter apparatus TA may be one of the transmitter apparatuses TA1, TA2-1, TA2-2, TA3 or TA4 as described above and may execute the steps S1 to S15 of the method MET.

Following description is given exemplarily for the case, when the network node NN is a base station. The base station may obtain the data symbol layers DT-1, DT-2, . . . , DT-J for example from a gateway (e.g. the 3GPP Mobility Management Entity (MME)) of a radio communication system. In such a case, the data symbol layers DT-1, DT-2, . . . , DT-J may be user data for one or several users. Alternatively, some or all of the data symbol layers DT-1, DT-2, . . . , DT-J may be internally generated by the processing unit PU for transmitting signalling information to one or several users.

The data symbol layers DT-1, DT-2, . . . , DT-J are provided to the transmitter apparatus TA, which generates the radio frequency signals RFS. The radio frequency signals RFS may be provided from the transmitter apparatus TA via the duplexer DP and the connection point CP to the antenna system of the base station BS.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for transmitting", "means for receiving", "means for determining" etc. (performing a certain function) shall be understood as functional blocks comprising circuitry that is adapted for performing a certain function, respectively. Hence, a "means for s.the." may as well be understood as a "means being adapted or suited for s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, DSP hardware, network processor, ASIC, FPGA, read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that the method MET disclosed in the specification or in the claims may be implemented by a device having means for performing each of the respective steps of these methods.

Preferably, a computer program product may contain computer-executable instructions for performing the method MET, when the computer program product is executed on a programmable hardware device such as a DSP, an ASIC or an FPGA. Preferably, a digital data storage device may encode a machine-executable program of instructions to perform the method MET.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. A transmitter apparatus for conditioning a multicarrier signal, said transmitter apparatus comprising:
    a processor unit configured to group subcarriers of said multicarrier signal into a first frequency block comprising a first group of said subcarriers and into at least a second frequency block comprising at least a second group of said subcarriers,
    a first filter configured to filter for sideband suppression outside of said first frequency block, and
    a second filter configured to filter for simultaneous and separate sideband suppression outside of said at least second frequency block;
    wherein:
    the first filter is configured to generate a first time domain signal;
    the second filter is configured to generate at least one second time domain signal;
    the first filter and the second filter are further configured to generate a universal filtered multi-carrier signal;
    the transmitter apparatus further comprises a back end processor unit, the back end processor unit comprising:
        a combiner configured to superimpose or add the first time domain signal and the at least one second time domain signal and to generate a total time domain signal;
        a digital-to-analog converter unit configured to convert the total time domain signal into an analogue time domain signal;
        a mixer configured to up-convert the analog time domain signal and to generate a radio frequency signal being shifted to a final central frequency position;
        a power amplifier configured to amplify the radio frequency signal and to generate an amplified radio frequency signal; and
        a filter unit configured to filter the amplified radio frequency signal and to generate a radio frequency signal to be applied to an antenna system.

2. The transmitter apparatus according to claim 1, wherein:
    a processor unit is configured to perform a single inverse fast Fourier Transformation; and
    said first filter and said second filter are low pass filters.

3. The transmitter apparatus according to claim 1, further comprising:
    a first processor unit configured to perform a first inverse discrete Fourier transformation for said first frequency block; and
    a second processor unit configured to perform at least a second inverse discrete Fourier transformation for said at least second frequency block.

4. The transmitter apparatus according to claim 3, wherein:
    the first processor unit is further configured to perform a first frequency shift to a first frequency range for said first frequency block,
    the second processor unit is further configured to perform at least a second frequency shift to at least a second frequency range for said at least second frequency block,
    the first filter is a first band pass filter for said first frequency range, and
    the second filter is a second band pass filter for said at least second frequency range.

5. The transmitter apparatus according to claim 3, wherein the first filter is a first low pass filter and wherein the second filter is a second low pass filter.

6. The transmitter apparatus according to claim 1, wherein:
    a first processor unit is configured to perform a first inverse fast Fourier transformation for said first frequency block,
    a second processor unit is configured to perform at least a second inverse fast Fourier transformation for said at least second frequency block, and
    the first filter and the second filter are low pass filters.

7. The transmitter apparatus according to claim 3, wherein said first filter and said second filter are configured according to either of the following:
    to filter at least two sub-bands of a fragmented spectrum and wherein said sub-bands are separated by at least one guard band, or
    to filter at least two subunits of at least one sub-band.

8. The transmitter apparatus according to claim 7, wherein said transmitter apparatus further comprises a switch configured to switch between a filtering of said at least two sub-bands and a filtering of said at least two subunits of said at least one sub-band.

9. The transmitter apparatus according to claim 7, wherein said transmitter apparatus further comprises either of the following:
    a single radio frequency processor unit for processing said filtered first frequency block and said at least second frequency block and for generating said multicarrier signal,
    a first radio frequency processor sub-unit for processing at least one of said filtered first frequency block and at least second frequency block and at least one second radio frequency processor sub-unit for processing at least one further of said filtered first frequency block and at least second frequency block.

10. The transmitter apparatus according to claim 7, wherein said transmitter apparatus further comprises a reconfiguration processor configured to reconfigure said transmitter apparatus between at least two of the following transmitter types:
    a first transmitter type,
    a second transmitter type, and
    a third transmitter type.

11. The transmitter apparatus according to claim 10, wherein said reconfiguration processor is configured to reconfigure said transmitter apparatus:
    to said first transmitter type, when a total number of said first frequency block and of said at least second frequency block is below to a predefined number,
    to said second transmitter type, when said total number of said first frequency block and of said at least second frequency block is equal to or above said predefined number and when a determined bandwidth of said first frequency block and of said at least second frequency block is below a predefined bandwidth,
    to said third transmitter type, when said total number of said first frequency block and said at least second frequency block is above said predefined number and when said determined bandwidth of said first frequency block and of said at least second frequency block is equal to or above said predefined bandwidth, or to said third transmitter type, when a usability of said first frequency block and/or said at least a second frequency block for a predefined radio access technology or for a predefined radio communication system changes periodically.

12. A network node comprising a transmitter apparatus according to claim 10.

13. A method for conditioning a multicarrier signal, said method comprising:
grouping subcarriers of said multicarrier signal into a first frequency block comprising a first group of said subcarriers and into at least a second frequency block comprising at least a second group of said subcarriers;
filtering said first frequency block for sideband suppression outside of said first frequency block; and
filtering said at least second frequency block for simultaneous and separate sideband suppression outside of said at least second frequency block;
wherein:
the filtering of the first frequency block comprises generating a first time domain signal;
the filtering of the at least one second frequency block comprises generating at least one second time domain signal, and further comprises generating a universal filtered multicarrier signal;
the method further comprises performing back end processing, the performing back end processing comprising:
superimposing or adding the first time domain signal and the at least one second time domain signal to generate a total time domain signal;
converting the total time domain signal into an analog time domain signal;
up-converting the analog time domain signal to generate a radio frequency signal being shifted to a final central frequency position;
amplifying the radio frequency signal to generate an amplified radio frequency signal; and
filtering the amplified radio frequency signal to generate a radio frequency signal to be applied to an antenna system.

14. A computer program product stored on a non-transitory computer readable medium comprising instructions which, when executed, cause a computer or processor to perform the method of claim 13.

15. A transmitter apparatus for conditioning a multicarrier signal, said transmitter apparatus comprising:
a processor unit configured to group subcarriers of said multicarrier signal into a first frequency block comprising a first group of said subcarriers and into at least a second frequency block comprising at least a second group of said subcarriers;
a second processor unit configured to perform a Fourier transformation of said first frequency block and of said at least second frequency block for generating a first part and at least a second part of a time domain signal;
a first filter configured to filter for sideband suppression outside of said first frequency block;
a second filter configured to filter for simultaneous and separate sideband suppression outside of said at least second frequency block;
a first Inverse Discrete Fourier Transformation (IDFT) processor unit configured to perform a first inverse discrete Fourier transformation for said first frequency block; and
a second IDFT processor unit configured to perform at least a second inverse discrete Fourier transformation for said at least second frequency block;
wherein said first filter and said second filter are configured according to either of the following:
to filter at least two sub-bands of a fragmented spectrum and
wherein said sub-bands are separated by at least one guard band, or
to filter at least two subunits of at least one sub-band;
wherein said transmitter apparatus further comprises a reconfiguration processor unit configured to reconfigure said transmitter apparatus between at least two of the following transmitter types:
a first transmitter type,
a second transmitter type, and
a third transmitter type;
wherein said reconfiguration processor unit is configured to reconfigure said transmitter apparatus:
to said first transmitter type, when a total number of said first frequency block and of said at least second frequency block is below a predefined number;
to said second transmitter type, when said total number of said first frequency block and of said at least second frequency block is equal to or above said predefined number and when a determined bandwidth of said first frequency block and of said at least second frequency block is below a predefined bandwidth; or
to said third transmitter type, when said total number of said first frequency block and said at least second frequency block is equal to or above said predefined number and when said determined bandwidth of said first frequency block and of said at least second frequency block is above said predefined bandwidth.

* * * * *